(12) United States Patent
Huh et al.

(10) Patent No.: US 12,663,615 B2
(45) Date of Patent: Jun. 23, 2026

US012663615B2

(54) OPTICAL IMAGING SYSTEM

(71) Applicant: SAMSUNG ELECTRO-MECHANICS CO., LTD., Suwon-si (KR)

(72) Inventors: Jae Hyuk Huh, Suwon-si (KR); Byung Hyun Kim, Suwon-si (KR); So Mi Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 855 days.

(21) Appl. No.: 17/700,659

(22) Filed: Mar. 22, 2022

(65) Prior Publication Data

US 2023/0107374 A1 Apr. 6, 2023

(30) Foreign Application Priority Data

Oct. 6, 2021 (KR) ........................ 10-2021-0132520

(51) Int. Cl.

*G02B 13/00* (2006.01)
*G02B 9/60* (2006.01)
*G02B 9/62* (2006.01)

(52) U.S. Cl.

CPC ........... *G02B 13/0045* (2013.01); *G02B 9/60* (2013.01); *G02B 9/62* (2013.01)

(58) Field of Classification Search

CPC ......... G02B 13/0045; G02B 9/60; G02B 9/62
See application file for complete search history.

(56) References Cited

U.S. PATENT DOCUMENTS

| | | | | |
|---|---|---|---|---|
| 9,989,741 | B1 * | 6/2018 | Hsueh | G02B 9/60 |
| 2012/0162784 | A1 | 6/2012 | Tang et al. | |
| 2013/0057966 | A1 | 3/2013 | Tsai et al. | |
| 2013/0182339 | A1 * | 7/2013 | Sekine | G02B 13/04 359/764 |
| 2014/0293445 | A1 | 10/2014 | Yoneyama et al. | |
| 2015/0212297 | A1 | 7/2015 | Chen et al. | |
| 2015/0253546 | A1 | 9/2015 | Sun | |

(Continued)

FOREIGN PATENT DOCUMENTS

| | | |
|---|---|---|
| CN | 102466867 A | 5/2012 |
| CN | 102566016 A | 7/2012 |

(Continued)

OTHER PUBLICATIONS

Chinese Office Action Issued on Mar. 26, 2024, in Counterpart Chinese Patent Application No. 202210666531.9 (4 Pages in English, 7 Pages in Chinese).

(Continued)

*Primary Examiner* — Ricky L Mack
*Assistant Examiner* — Natasha Nigam
(74) *Attorney, Agent, or Firm* — NSIP Law

(57) ABSTRACT

An optical imaging system is provided. The optical imaging system includes a first lens, a second lens, a third lens, a fourth lens, and a fifth lens disposed in order from an object side to an imaging side. The first lens has positive refractive power, while the second lens has negative refractive power. TTL>10.2 mm, and TTL/(2×IMG HT)≤1.7, where TTL is a distance from an object-side surface of the first lens to an imaging plane on an optical axis, and IMG HT is equal to half a diagonal length of the imaging plane.

11 Claims, 9 Drawing Sheets

(56) References Cited

U.S. PATENT DOCUMENTS

| | | | |
|---|---|---|---|
| 2016/0103298 | A1 | 4/2016 | Liao et al. |
| 2016/0103299 | A1 | 4/2016 | Lin et al. |
| 2016/0261780 | A1 | 9/2016 | Lin |
| 2016/0377831 | A1 | 12/2016 | Liu et al. |
| 2017/0010442 | A1 | 1/2017 | Bone et al. |
| 2017/0102524 | A1 | 4/2017 | Jo |
| 2017/0192206 | A1 | 7/2017 | Chen et al. |
| 2017/0235104 | A1 | 8/2017 | Lai et al. |
| 2018/0059376 | A1 | 3/2018 | Lin et al. |
| 2018/0143403 | A1 | 5/2018 | Tseng et al. |
| 2018/0164549 | A1 | 6/2018 | Wang |
| 2018/0172956 | A1 | 6/2018 | Son |
| 2018/0180847 | A1 | 6/2018 | Yoo |
| 2018/0188496 | A1 | 7/2018 | Hsieh et al. |
| 2018/0239114 | A1 | 8/2018 | Hsueh et al. |
| 2019/0361229 | A1 | 11/2019 | Chang et al. |
| 2020/0088972 | A1 | 3/2020 | Yoo et al. |
| 2021/0018725 | A1 | 1/2021 | Hsu et al. |
| 2021/0033819 | A1 | 2/2021 | Lv et al. |
| 2021/0109327 | A1 | 4/2021 | Huang |
| 2021/0132343 | A1 | 5/2021 | Chen et al. |
| 2021/0223516 | A1 | 7/2021 | Lin et al. |
| 2021/0278638 | A1 | 9/2021 | Sekine |
| 2022/0035126 | A1 | 2/2022 | Zhao et al. |
| 2022/0035130 | A1 | 2/2022 | Jhang et al. |
| 2022/0137344 | A1 | 5/2022 | Tan |

FOREIGN PATENT DOCUMENTS

| | | | | | |
|---|---|---|---|---|---|
| CN | 102981246 | A | | 3/2013 | |
| CN | 104007537 | A | | 8/2014 | |
| CN | 203773137 | U | | 8/2014 | |
| CN | 104914558 | A | | 9/2015 | |
| CN | 105093494 | A | | 11/2015 | |
| CN | 105445904 | A | | 3/2016 | |
| CN | 105511052 | A | | 4/2016 | |
| CN | 105807392 | A | | 7/2016 | |
| CN | 105988184 | A | | 10/2016 | |
| CN | 106291872 | A | | 1/2017 | |
| CN | 106569314 | A | | 4/2017 | |
| CN | 107085286 | A | | 8/2017 | |
| CN | 107664811 | A | | 2/2018 | |
| CN | 107765396 | A | | 3/2018 | |
| CN | 108459391 | A | | 8/2018 | |
| CN | 110515177 | A | | 11/2019 | |
| CN | 111221106 | A | | 6/2020 | |
| CN | 111239982 | A | | 6/2020 | |
| CN | 111338062 | A | | 6/2020 | |
| CN | 111352218 | A | | 6/2020 | |
| CN | 111679410 | A | | 9/2020 | |
| CN | 112147756 | A | | 12/2020 | |
| CN | 112162384 | A | | 1/2021 | |
| CN | 112230389 | A | | 1/2021 | |
| CN | 112684575 | A | | 4/2021 | |
| CN | 112799218 | A | | 5/2021 | |
| CN | 112925086 | A | | 6/2021 | |
| CN | 112965212 | A | | 6/2021 | |
| CN | 213338182 | U | | 6/2021 | |
| CN | 113138457 | A | | 7/2021 | |
| CN | 113267870 | A | * | 8/2021 | ........... G02B 13/006 |
| CN | 113933967 | A | * | 1/2022 | ............. G03B 30/00 |
| EP | 3 964 874 | A1 | | 3/2022 | |
| KR | 10-2018-0076894 | A | | 7/2018 | |
| KR | 10-2020-0031512 | A | | 3/2020 | |
| TW | I616699 | B | | 3/2018 | |
| TW | I689748 | B | | 4/2020 | |
| TW | I727875 | B | | 5/2021 | |
| WO | WO 2018/214396 | A1 | | 11/2018 | |

OTHER PUBLICATIONS

Taiwanese Office Action Issued on Jan. 11, 2023, in counterpart Taiwanese Patent Application No. 111110568 (5 Pages in English, 5 Pages in Chinese).

Korean Office Action issued on Mar. 13, 2024, in counterpart Korean Patent Application No. 10-2021-0132520 (9 pages in English, 7 pages in Korean).

Chinese Office Action Issued on Feb. 20, 2025, in Counterpart Chinese Patent Application No. 202210666531.9 (5 Pages in English, 9 Pages in Chinese).

Taiwanese Office Action Issued on Apr. 8, 2025, in Counterpart Taiwanese Patent Application No. 113108725 (7 Pages in English, 6 Pages in Chinese).

Taiwanese Office Action Issued on Apr. 9, 2025, in Counterpart Taiwanese Patent Application No. 113135731 (7 Pages in English, 6 Pages in Chinese).

Chinese Office Action issued on May 13, 2025, in corresponding Chinese Patent Application No. 202210666531.9. (9pages in English, 15pages in Chinese).

Taiwanese Office Action Issued on Oct. 2, 2025, in Counterpart Taiwanese Patent Application No. 113108725 (8 Pages in English, 6 Pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-0132520 filed on Oct. 6, 2021 in the Korean Intellectual Property Office, the entire disclosure of which is incorporated herein by reference for all purposes.

BACKGROUND

1. Field

The following description relates to an optical imaging system.

2. Description of Related Art

Portable terminals may include a camera including an optical imaging system incorporated with a plurality of lenses to perform operations such as, but not limited to, video calls and image capturing.

As operations that are performed by the camera included in portable terminals has gradually increased, there is increasing demand for high resolution cameras for the portable terminals.

An image sensor having a high pixel count (for example, 13 million to 100 million pixels, or the like) may be employed in camera incorporated in portable terminals to achieve improved picture quality.

Additionally, since portable terminals may be implemented to have a small size, the camera disposed in a portable terminal may also be implemented to have a reduced size, and thus, it may be desirable to develop an optical imaging system which may achieve high resolution while having a reduced size.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, and a fifth lens disposed in order from an object side to an imaging side, wherein: the first lens has positive refractive power, and the second lens has negative refractive power; and $TTL>10.2$ mm, and $TTL/(2\times IMG\ HT)\leq 1.7$, where TTL is a distance from an object-side surface of the first lens to an imaging plane on an optical axis, and IMG HT is equal to half a diagonal length of the imaging plane.

In the optical imaging system, $IMG\ HT\geq 4.5$ mm where f is a total focal length of the optical imaging system.

$n2+n3>3.20$, where n2 is a refractive index of the second lens, and n3 is a refractive index of the third lens.

$|f/f1+f/f2|<1.2$, where f is a total focal length of the optical imaging system, f1 is a focal length of the first lens, and f2 is a focal length of the second lens.

$BFL/f<0.4$, where f is a total focal length of the optical imaging system, and BFL is a distance from an image-side surface of the fifth lens to the imaging plane on an optical axis.

$0.80\leq TTL/f\leq 1.05$, where f is a total focal length of the optical imaging system.

$0\leq D1/f\leq 0.05$, where f is a total focal length of the optical imaging system, and D1 is a distance between an image-side surface of the first lens and an object-side surface of the second lens on an optical axis.

$R1/f\leq 0.35$, where f is a focal length of the optical imaging system, and R1 is a radius of curvature of an object-side surface of the first lens.

The third lens may have positive refractive power, the fourth lens may have negative refractive power, and the fifth lens may have negative refractive power.

The third lens may have positive refractive power, the fourth lens may have positive refractive power, and the fifth lens may have negative refractive power.

The third lens may have negative refractive power, the fourth lens may have positive refractive power, and the fifth lens may have negative refractive power.

The optical imaging system may further include a sixth lens, disposed between the fifth lens and the imaging plane, wherein: the third lens has positive refractive power, the fourth lens has positive refractive power, the fifth lens has negative refractive power, and the sixth lens has negative refractive power.

The optical imaging system may further include a sixth lens disposed between the fifth lens and the imaging plane, wherein: the third lens has positive refractive power, the fourth lens has positive refractive power, the fifth lens has positive refractive power, and the sixth lens has negative refractive power.

A refractive index of at least one of the second and third lenses may be greater than 1.64.

An absolute value of a focal length of each of the first and second lenses may be greater than an absolute value of focal lengths of the third lens, the fourth lens, and the fifth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
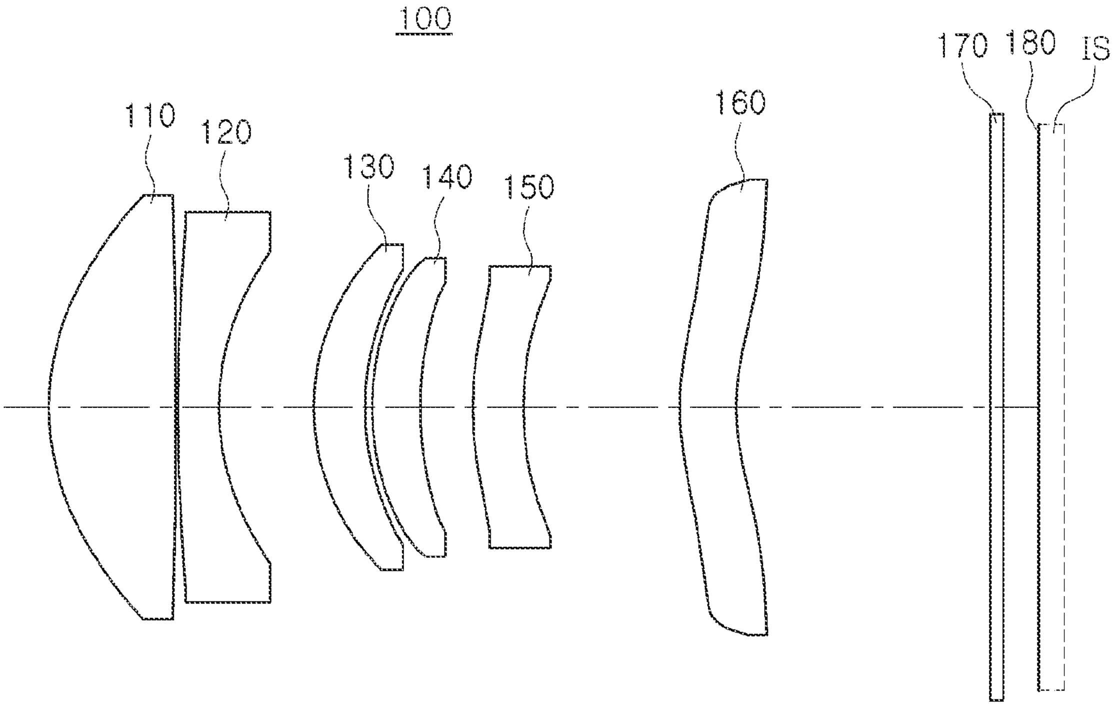
FIG. 1 is a diagram illustrating an example optical imaging system according to a first example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

Hereinafter, examples of the present disclosure will be described as follows with respect to the accompanying drawings.

The one or more examples provide an optical imaging system which may implement high resolution.

In the lens diagrams, a thickness, a size, and a shape of the lens are exaggerated, and specifically, the shape of a spherical or aspherical surface presented in the lens diagram is merely an example and is not limited thereto.

An optical imaging system, according to an example embodiment, may include a plurality of lenses disposed along an optical axis. The plurality of lenses may be spaced apart from each other by a predetermined distance along the optical axis.

As an example, the optical imaging system includes five or six lenses.

Among lenses included in an optical imaging system, a forwardmost lens may refer to a lens most adjacent to an object-side surface (or a reflective member), and a rearmost lens may refer to a lens most adjacent to an imaging plane (or an image sensor).

As an example, in an embodiment in which an optical imaging system includes five lenses, a first lens may refer to a lens most adjacent to an object side (or a reflective member), and a fifth lens may refer to a lens most adjacent to an imaging plane (or an image sensor).

In an embodiment in which an optical imaging system includes six lenses, a first lens may refer to a lens most adjacent to an object side (or a reflective member), and a sixth lens may refer to a lens most adjacent to an imaging plane (or an image sensor). Additionally, in the example embodiment, a radius of curvature, a thickness, a distance, and a focal length of the lens are indicated in millimeters (mm), and a field of view (FOV) is indicated in degrees.

In the description of the shape of each lens, the configuration in which one surface is convex indicates that a paraxial region portion or area of the surface is convex, the configuration in which one surface is concave indicates that a paraxial region portion or area of the surface is concave, and the configuration in which one surface is flat indicates that a paraxial region portion or area of the surface is flat. Thus, when one surface of the lens is described as being convex, the edge portion of the lens may be concave. Similarly, when one surface of the lens is described as being concave, the edge portion of the lens may be convex. Additionally, when one surface of the lens is described as being flat, the edge portion of the lens may be convex or concave.

The paraxial region may refer to a significantly narrow region adjacent to the optical axis.

The imaging plane may refer to a virtual plane on which a focused image is formed by the optical imaging system. Alternatively, the imaging plane may refer to one surface of the image sensor on which light is received.

An optical imaging system in an example embodiment may include six lenses.

In an example, the optical imaging system in an example embodiment may include a first lens, a second lens, a third lens, a fourth lens, a fifth lens, and a sixth lens arranged in order from an object side to an imaging side. The first to sixth lenses may be spaced apart from each other by predetermined distances along the optical axis.

An optical imaging system in another example embodiment may include five lenses.

For example, the optical imaging system in an example embodiment may include a first lens, a second lens, a third lens, a fourth lens, and a fifth lens arranged in order from an object side to an imaging side. The first to fifth lenses may be spaced apart from each other by predetermined distances along the optical axis.

However, the optical imaging system in an example embodiment may not only include five lenses or six lenses, and may further include other components, as necessary.

Figure 15:
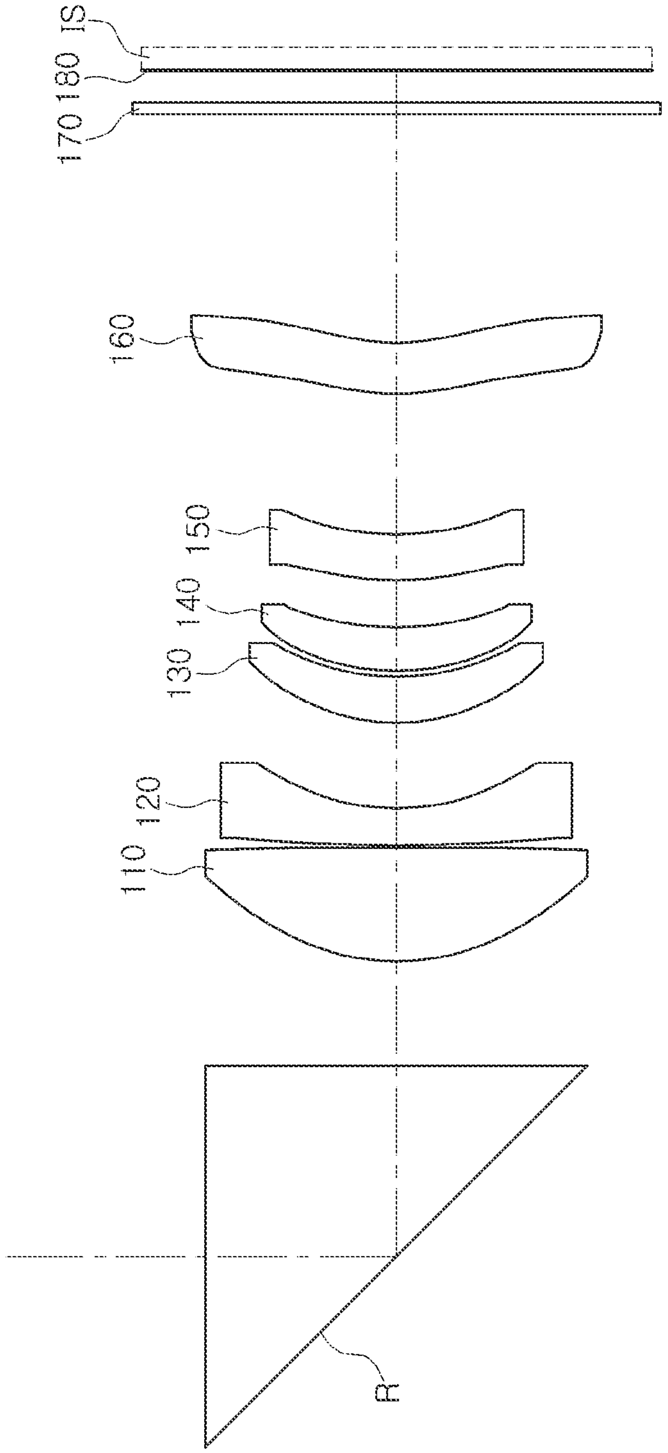
FIG. 15 is a diagram illustrating an example in which a reflective member is included in the example optical imaging system illustrated in FIG. 1.

For example, referring to FIG. 15, an optical imaging system may further include a reflective member having a reflective surface that changes a path of light. The reflective member may be configured to change an optical member by, as only an example, 90 degrees. As an example, the reflective member may be implemented as a mirror or a prism.

The reflective member may be disposed in front of a plurality of lenses. As an example, the reflective member may be disposed in front of the first lens (for example, more adjacent to the object side than the first lens). Therefore, in the one or more examples, a lens disposed most adjacent to the object side may be a lens disposed most adjacent to the reflective member.

The optical imaging system may further include an image sensor that converts an incident image of a subject into an electrical signal.

The optical imaging system may further include an infrared cut-off filter (hereinafter, referred to as a "filter") that blocks infrared rays. The filter may be disposed between a lens disposed most adjacent to an imaging plane (the fifth lens or the sixth lens) and the imaging plane.

The optical imaging system may further include a stop adjusting the amount of light.

The overall lenses, included in the optical imaging system in an example embodiment, may be formed of a plastic material.

In addition, each lens may be formed of a plastic material having optical properties different from those of adjacent lenses.

Figure 16:
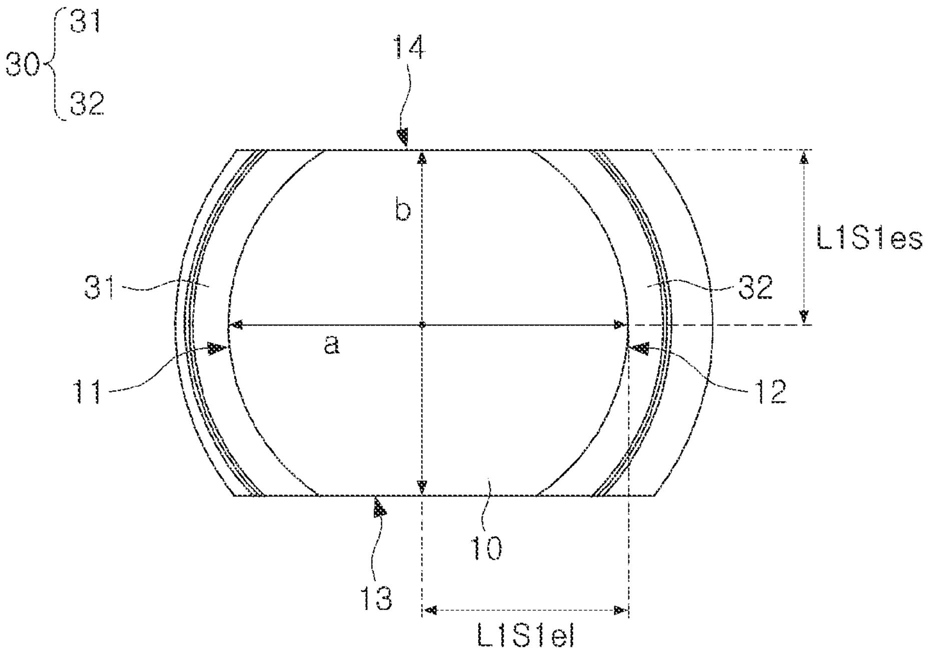
FIG. 16 is a plan view illustrating a non-circular lens of an example optical imaging system according to an example embodiment.

Referring to FIG. 16, at least some of the lenses of the optical imaging system may have a non-circular planar shape. In an example, the forwardmost lens and the rearmost lens may have a non-circular planar shape. The other lenses may have a non-circular planar shape or a circular planar shape.

A non-circular lens may have four side surfaces, and the two side surfaces are formed to oppose each other. In addition, the side surfaces opposing each other may have corresponding shapes.

In an example, the first lens may have a first side surface, a second side surface, a third side surface, and a fourth side surface. The first side surface and the second side surface are disposed to oppose each other with respect to the optical axis, and the third side surface and the fourth side surface are disposed to oppose each other with respect to the optical axis. Each of the third side surface and the fourth side surface may connect the first side surface and the second side surface.

When viewed in an optical axis direction, the first side surface and the second side surface of the first lens may have an arc shape, and the third side and the fourth side may have a substantially linear shape.

Each of the third side surface and the fourth side surface may connect the first side surface and the second side surface. Also, the third side surface and the fourth side surface may be symmetrical with respect to the optical axis and may be formed to be parallel to each other.

A non-circular lens may have a first axis and a second axis intersecting the optical axis. In an example, the first axis may be an axis connecting the first side surface and the second side surface while passing through the optical axis, and the second axis may be an axis connecting the third side and the fourth side while passing through the optical axis. The first axis and the second axis may be perpendicular to each other, and a length of the first axis may be greater than that of the second axis.

In an example, the first lens may have two axes intersecting the optical axis and perpendicular to each other, and one of the two axes may have a length greater than that of the other of the two axes.

Referring to FIG. 16, all lenses of the optical imaging system may include an optical portion 10 and a flange portion 30 (31, 32).

The optical portion 10 may be a portion in which optical performance of the lens is exhibited. In an example, light reflected from a subject may be refracted while passing through the optical portion 10.

The optical portion 10 may have refractive power and may have an aspherical shape.

Additionally, the optical portion 10 may have an object-side surface (a surface facing an object side) and an image-side surface (a surface facing an image side) (the object-side surface is illustrated in FIG. 16).

The flange portion 30 may be a portion fixing a lens to another component, for example, a lens barrel or another lens.

The flange portion 30 may extend from a periphery of at least a portion of the optical portion 10, and may be formed to be integrated with the optical portion 10.

In the non-circular lens, the optical portion 10 and the flange portion 30 may be formed to be non-circular. In an example, the optical portion 10 and the flange portion 30 may be non-circular when viewed in the optical axis direction (see FIG. 16). Alternatively, the optical portion 10 may be formed to be circular, while the flange portion 30 may be formed to be non-circular.

The optical portion 10 may include a first edge 11, a second edge 12, a third edge 13 and a fourth edge 14. The first edge 11 and the second edge 12 may be disposed to oppose each other, and the third edge 13 and the fourth edge 14 may be disposed to oppose each other.

Each of the third edge 13 and the fourth edge 14 may connect the first edge 11 and the second edge 12.

The first edge 11 and the second edge 12 may be disposed to oppose each other with respect to the optical axis, and the third edge 13 and the fourth edge 14 may be disposed to oppose each other with respect to the optical axis.

When viewed in the optical axis direction, the first edge 11 and the second edge 12 may have an arc shape, and the third edge 13 and the fourth edge 14 may have a substantially linear shape. The third edge 13 and the fourth edge 14 may be formed to be symmetrical with respect to an optical axis (a Z-axis) and to be parallel to each other.

A shortest distance between the first edge 11 and the second edge 12 may be greater than a shortest distance between the third edge 13 and the fourth edge 14.

The optical portion 10 may have a major axis "a" and a minor axis "b." In an example, when viewed from the optical axis direction, a line segment connecting the third edge 13 and the fourth edge 14 at the shortest distance while passing through the optical axis may be the minor axis "b," and a line segment connecting the first edge 11 and the second edge 12 while passing through the optical axis and perpendicular to the minor axis "b" may be the major axis "a."

In this example, half of the major axis "a" may be a maximum effective radius, and half of the minor axis "b" may be a minimum effective radius.

Assuming that the lens illustrated in FIG. 16 is a forwardmost lens (for example, a first lens), a maximum effective radius of an object-side surface of the forwardmost lens is a reference numeral L1S1*el* of FIG. 16, and a minimum effective radius of the object-side surface of the forwardmost lens is a reference numeral L1S1*es* of FIG. 16.

The flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to one side surface of the optical portion 10 on which the flange portion 30 is not formed, and the fourth edge 14 of the optical portion 10 may refer to the other or opposing side surface of the optical portion 10 on which the flange portion 30 is not formed.

An effective radius of each of the first lens and the fifth lens may be greater than an effective radius of each of the other lenses.

The term "effective radius" refers to a radius of one surface (object-side surface and image-side surface) of each lens through which light actually passes. In an example, the term "effective radius" may refer to a radius of an optical portion of each lens.

A non-circular lens may have a maximum effective radius (half of a straight line connecting the first edge 11 and second edge 12 while passing through the optical axis) and a minimum effective radius (half of a straight line connecting the third edge 13 and the fourth edge 14 while passing through the optical axis).

In the one or more examples, the term "effective radius" may refer to a maximum effective radius unless otherwise specified.

Each of the plurality of lenses may have at least one aspherical surface.

That is, at least one of the first and second surfaces of each lens may be an aspherical surface. The aspherical surface of each lens is represented, as follows:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} \ldots \quad \text{Equation 1}$$

In Equation 1, c is a curvature of the lens (a reciprocal of the radius of curvature), K is a conic constant, and Y is a distance from one point on an aspherical surface of a lens to an optical axis. Additionally, constants A to J are aspheric coefficients. Z is a distance from one point on the aspherical surface of the lens to a vertex of the aspherical surface.

The optical imaging system including the first lens to the sixth lens may respectively have a positive refractive power, a negative refractive power, a positive refractive power, a positive refractive power, a negative refractive power, and a negative refractive power in order from the object side to the imaging side, or a positive refractive power, a negative refractive power, a positive refractive power, a positive refractive power, a positive refractive power, and a negative refractive power in order from the object side to the imaging side.

The optical imaging system including the first lens to the fifth lens may respectively have a positive refractive power, a negative refractive power, a positive refractive power, a negative refractive power, and a negative refractive power in order from the object side to the imaging side, or a positive refractive power, a negative refractive power, a positive refractive power, a positive refractive power, and a negative refractive power in order from the object side to the imaging side, or a positive refractive power, a negative refractive power, a negative refractive power, a positive refractive power, and a negative refractive power in order from the object side to the imaging side.

The optical imaging system in an example embodiment may satisfy at least one of the conditional expressions, as follows:

$TTL > 10.2$ mm  Conditional Expression 1:

10.2 mm $< TTL <$ 16 mm  Conditional Expression 2:

$TTL/(2 \times IMG\ HT) \leq 1.7$  Conditional Expression 3:

$$1.2<TTL/(2\times IMG\ HT)\leq 1.7$$ Conditional Expression 4:

$$1.5<f/IMG\ HT<3.5$$ Conditional Expression 5:

$$IMG\ HT\geq 4.5\ \text{mm}$$ Conditional Expression 6:

$$n2+n3>3.20$$ Conditional Expression 7:

$$|f/f1+f/f2|<1.2$$ Conditional Expression 8:

$$0\leq D1/f\leq 0.05$$ Conditional Expression 9:

$$0.80\leq TTL/f\leq 1.05$$ Conditional Expression 10:

$$R1/f\leq 0.35$$ Conditional Expression 11:

$$BFL/f\leq 0.4$$ Conditional Expression 12:

In the conditional expressions, f is a total focal length of the optical imaging system, f1 is a focal length of the first lens, and f2 is a focal length of the second lens.

In the conditional expressions, n2 is a refractive index of the second lens, and n3 is a refractive index of the third lens.

In the conditional expressions, TTL is a distance from the object-side surface of the forwardmost or first lens to the imaging plane on the optical axis, and BFL is a distance from the image-side surface of the rearmost lens to the imaging plane on the optical axis.

In the conditional expressions, D1 is a distance between the image-side surface of the first lens and the object-side surface of the second lens on the optical axis, R1 is a radius of curvature of the object-side surface of the first lens, and IMG HT is equal to half a diagonal length of the imaging plane.

The optical imaging system in an example embodiment may have characteristics of a telephoto lens having a relatively narrow field of view and a relatively long focal length.

Additionally, the optical imaging system in an example embodiment may be configured to have a relatively large diagonal length of the imaging plane. In an example, an effective imaging area of the image sensor may be wide (for example, a high-pixel image sensor).

Accordingly, when a captured image is cropped, images at various magnifications may be captured without degradation of image quality.

At least one of the second and third lenses may have a refractive index greater than 1.64.

An absolute value of the focal length of each of the first lens and the second lens may be greater than an absolute value of the focal lengths of the other lenses.

An optical imaging system according to a first example embodiment will be described with reference to FIGS. 1 and 2.

An optical imaging system 100 in the first example embodiment may include an optical system including a first lens 110, a second lens 120, a third lens 130, a fourth lens 140, a fifth lens 150, and a sixth lens 160, and may further include a filter 170 and an image sensor IS.

The optical imaging system 100 in the first example embodiment may form a focused image on an imaging plane 180 of the imaging sensor IS. The imaging plane 180 may refer to a surface on which a focused image is formed by the optical imaging system 100. In an example, the imaging plane 180 may refer to one surface of the image sensor IS on which light is received.

Although not illustrated in FIG. 1, the optical imaging system 100 may further include a reflective member R (FIG. 15) disposed in front of the first lens 110 and having a reflective surface that changes a path of light. In the first example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 1 below.

TABLE 1

| Surface No. | Note | Radius of Curvature | Thickness or Distance | Refractive Index | Abbe Number | Focal Length |
|---|---|---|---|---|---|---|
| S1 | First Lens | 4.88812 | 2.000 | 1.537 | 55.7 | 8.89684 |
| S2 | | −183.206 | 0.035 | | | |
| S3 | Second Lens | 40.5003 | 0.650 | 1.646 | 23.5 | −8.37698 |
| S4 | | 4.74071 | 1.500 | | | |
| S5 | Third Lens | 4.28847 | 0.811 | 1.679 | 19.2 | 29.0606 |
| S6 | | 5.06051 | 0.103 | | | |
| S7 | Fourth Lens | 5.12924 | 0.763 | 1.537 | 55.7 | 36.6343 |
| S8 | | 6.57698 | 0.827 | | | |
| S9 | Fifth Lens | 6.73404 | 0.800 | 1.646 | 23.5 | −150.891 |
| S10 | | 6.00505 | 2.468 | | | |
| S11 | Sixth Lens | 5.18474 | 0.892 | 1.537 | 55.7 | −131.139 |
| S12 | | 4.5389 | 4.024 | | | |
| S13 | Filter | Infinity | 0.210 | 1.519 | 64.2 | |
| S14 | | Infinity | 0.541 | | | |
| S15 | Imaging Plane | Infinity | | | | |

A total focal length f of the optical imaging system in the first example embodiment is 15 mm, and IMG HT is 5.128 mm.

In the first example embodiment, the first lens 110 may have positive refractive power, and the first surface of the first lens 110 may be convex, and the second surface of the first lens 110 may also be convex.

The second lens 120 may have negative refractive power, the first surface of the second lens 120 may be convex, and the second surface of the second lens 120 may be concave.

The third lens 130 may have positive refractive power, the first surface of the third lens 130 may be convex, and the second surface of the third lens 130 may be concave.

The fourth lens 140 may have positive refractive power, the first surface of the fourth lens 140 may be convex, and the second surface of the fourth lens 140 may be concave.

The fifth lens 150 may have negative refractive power, the first surface of the fifth lens 150 may be convex, and the second surface of the fifth lens 150 may be concave.

The sixth lens 160 may have negative refractive power, the first surface of the sixth lens 160 may be convex in a paraxial region, and the second surface of the sixth lens 160 may be concave in the paraxial region.

Additionally, the sixth lens 160 may have at least one inflection point formed on at least one of the first surface and the second surface. In an example, the second surface of the sixth lens 160 may be concave in the paraxial region and convex in a portion, other than the paraxial region.

Each surface of the first lens 110 to the sixth lens 160 may have an aspherical coefficient as listed in Table 2 below. In an example, both the object-side surfaces and the image-side surfaces of the first lens 110 to the sixth lens 160 may be aspherical.

TABLE 2

| | S1 | S2 | S3 | S4 | S5 | S6 |
|---|---|---|---|---|---|---|
| Conic Constant (K) | −0.61773 | 99.00000 | 96.62200 | 0.00000 | 0.00000 | −0.06992 |
| 4th Coefficient (A) | 8.6874E−05 | 1.5795E−04 | −1.4975E−04 | −8.8221E−04 | −5.7269E−04 | −7.8328E−04 |
| 6th Coefficient (B) | −1.0583E−05 | −4.4744E−06 | 1.6678E−05 | −4.8100E−05 | −4.9634E−05 | −3.0864E−05 |
| 8th Coefficient (C) | −7.9639E−07 | −2.4060E−07 | −5.9954E−07 | −1.7409E−07 | −8.0018E−07 | −9.6212E−07 |
| 10th Coefficient (D) | −2.2904E−08 | −2.7295E−08 | −9.4857E−08 | 1.4706E−07 | 3.5719E−07 | 1.3966E−08 |
| 12th Coefficient (E) | 2.0408E−10 | −1.0404E−09 | −9.1312E−09 | −6.2382E−09 | 4.1250E−08 | 1.2883E−07 |
| 14th Coefficient (F) | 7.6155E−11 | 3.6812E−11 | −4.8547E−10 | −3.2787E−09 | 7.5936E−09 | 2.7155E−08 |
| 16th Coefficient (G) | 1.2628E−11 | −1.5410E−11 | −4.8694E−12 | −4.9947E−10 | 5.6394E−10 | 3.3196E−09 |
| 18th Coefficient (H) | −2.6909E−13 | −1.6348E−13 | 2.6474E−12 | −2.6233E−11 | −6.4556E−12 | −3.4625E−11 |
| 20th Coefficient (J) | −2.5432E−14 | 1.3512E−13 | 2.4770E−13 | 7.0474E−12 | −1.5393E−11 | −1.2811E−10 |

| | S7 | S8 | S9 | S10 | S11 | S12 |
|---|---|---|---|---|---|---|
| Conic Constant (K) | 0.32611 | −1.03960 | −1.96970 | 1.16560 | −8.43620 | −6.82180 |
| 4th Coefficient (A) | −8.8952E−04 | −4.4342E−04 | −1.7380E−03 | −1.4565E−03 | −4.2986E−03 | −4.0917E−03 |
| 6th Coefficient (B) | 1.1874E−04 | 2.0523E−05 | −1.0126E−04 | 3.5440E−04 | 5.0628E−05 | 1.3189E−05 |
| 8th Coefficient (C) | 9.9134E−06 | 2.6861E−05 | −3.9424E−06 | −2.2367E−05 | 1.5469E−05 | 1.1750E−05 |
| 10th Coefficient (D) | 3.0292E−06 | 5.7647E−06 | −2.2515E−06 | −6.0554E−06 | 4.4075E−07 | 1.4933E−07 |
| 12th Coefficient (E) | 2.9743E−07 | 3.7394E−07 | −4.0516E−07 | 9.3887E−08 | −2.9788E−08 | −2.7912E−08 |
| 14th Coefficient (F) | 3.0550E−08 | 1.6823E−08 | −2.4724E−08 | −3.3051E−08 | −4.5808E−09 | −2.0148E−09 |
| 16th Coefficient (G) | 2.2328E−09 | 3.6798E−10 | −7.7085E−10 | −7.7494E−10 | −1.2820E−10 | 1.3552E−10 |
| 18th Coefficient (H) | −1.5768E−10 | −4.6988E−10 | −4.0421E−10 | −4.5377E−10 | −3.4651E−13 | −1.0375E−11 |
| 20th Coefficient (J) | −1.2146E−10 | 3.8515E−11 | 2.4638E−10 | 2.8143E−10 | 1.6649E−12 | 6.2658E−13 |

Figure 2:
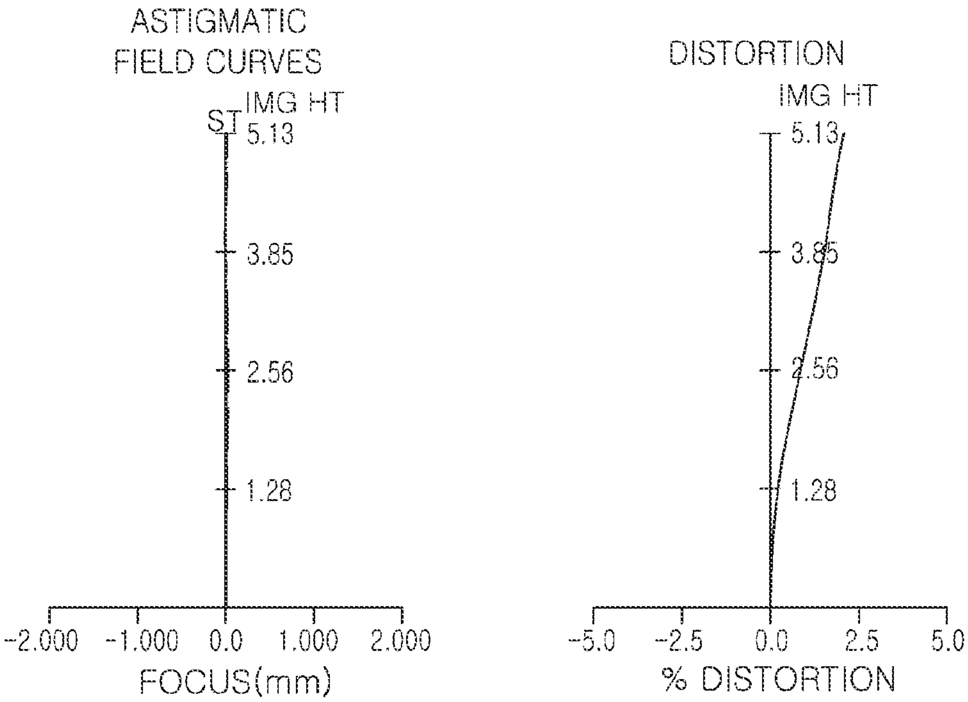
FIG. 2 is a diagram illustrating aberration properties of the example optical imaging system illustrated in FIG. 1.

The above-configured optical imaging system 100 may have aberration properties illustrated in FIG. 2.

An optical imaging system according to a second example embodiment will be described with reference to FIGS. 3 and 4.

An optical imaging system 200 in the second example embodiment may include an optical system including a first lens 210, a second lens 220, a third lens 230, a fourth lens 240, a fifth lens 250, and a sixth lens 260, and may further include a filter 270 and an image sensor IS.

The optical imaging system 200 in the second example embodiment may form a focused image on an imaging plane 280. The imaging plane 280 may refer to a surface of the image sensor IS on which a focused image is formed by the optical imaging system 200. In an example, the imaging plane 280 may refer to one surface of the image sensor IS on which light is received.

Figure 3:
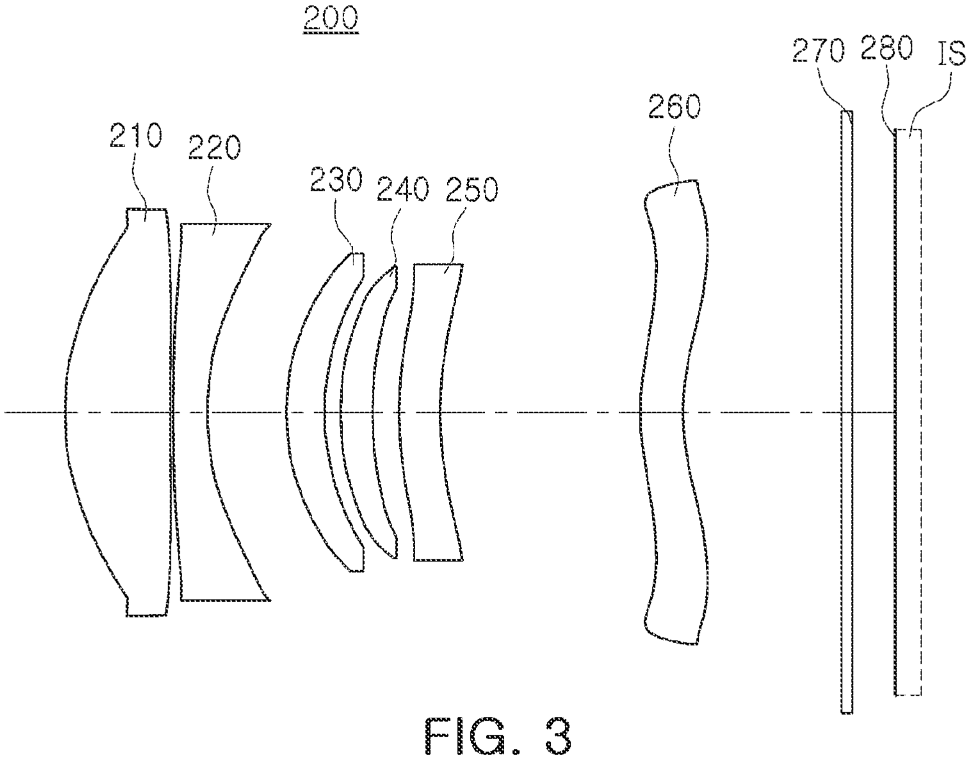
FIG. 3 is a diagram illustrating an example optical imaging system according to a second example embodiment.

Although not illustrated in FIG. 3, the optical imaging system 200 may further include a reflective member R (FIG. 15) disposed in front of the first lens 210 and having a reflective surface that changes a path of light. In the second example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 3 below.

TABLE 3

| Surface No. | Note | Radius of Curvature | Thickness or Distance | Refractive Index | Abbe Number | Focal Length |
|---|---|---|---|---|---|---|
| S1 | First Lens | 4.9489607 | 2.000 | 1.537 | 55.7 | 9.14375 |
| S2 | | −556.8638 | 0.050 | | | |
| S3 | Second Lens | 35.489609 | 0.650 | 1.646 | 23.5 | −8.68276 |
| S4 | | 4.8058549 | 1.500 | | | |
| S5 | Third Lens | 4.0957987 | 0.722 | 1.679 | 19.2 | 44.0122 |
| S6 | | 4.4080644 | 0.300 | | | |
| S7 | Fourth Lens | 4.9340121 | 0.614 | 1.537 | 55.7 | 29.4635 |
| S8 | | 6.8575524 | 0.500 | | | |
| S9 | Fifth Lens | 6.794379 | 0.775 | 1.646 | 23.5 | 144.143 |
| S10 | | 7.0017622 | 3.797 | | | |
| S11 | Sixth Lens | 5.0156608 | 0.800 | 1.537 | 55.7 | −54.7209 |
| S12 | | 4.0457338 | 3.000 | | | |
| S13 | Filter | Infinity | 0.210 | 1.519 | 64.2 | |
| S14 | | Infinity | 0.813 | | | |
| S15 | Imaging Plane | Infinity | | | | |

A total focal length f of the optical imaging system in the second example embodiment is 15 mm, and IMG HT is 5.4 mm.

In the second example embodiment, the first lens 210 may have positive refractive power, and the first surface of the first lens 210 and the second surface of the first lens 210 may also be convex.

The second lens 220 may have negative refractive power, the first surface of the second lens 220 may be convex, and the second surface of the second lens 220 may be concave.

The third lens 230 may have positive refractive power, the first surface of the third lens 230 may be convex, and the second surface of the third lens 230 may be concave.

The fourth lens 240 may have positive refractive power, the first surface of the fourth lens 240 may be convex, and the second surface of the fourth lens 240 may be concave.

The fifth lens 250 may have positive refractive power, the first surface of the fifth lens 250 may be convex, and the second surface of the fifth lens 250 may be concave.

The sixth lens 260 may have negative refractive power, the first surface of the sixth lens 260 may be convex in a paraxial region, and the second surface of the sixth lens 260 may be concave in the paraxial region.

Additionally, the sixth lens 260 may have at least one inflection point formed on at least one of the first surface and the second surface. In an example, the first surface of the sixth lens 260 may be convex in the paraxial region and concave in a portion or region, other than the paraxial region. Additionally, the second surface of the sixth lens 260 may be concave in the paraxial region and convex in a portion or region, other than the paraxial region.

Each surface of the first lens 210 to the sixth lens 260 may have an aspherical coefficient as illustrated in Table 4 below. In an example, both the object-side surfaces and the image-side surfaces of the first lens 210 to the sixth lens 260 may be aspherical.

Figure 4:
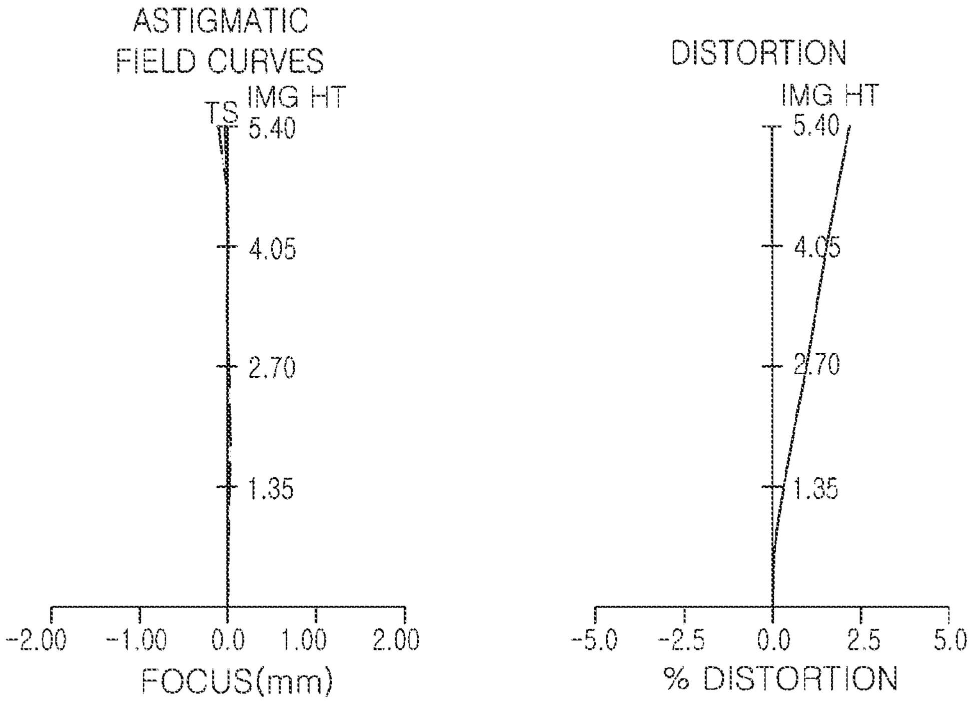
FIG. 4 is a diagram illustrating aberration properties of the example optical imaging system illustrated in FIG. 3.

Additionally, the above-configured optical imaging system may have aberration properties illustrated in FIG. 4.

An optical imaging system 300 according to a third example embodiment will be described with reference to FIGS. 5 and 6.

An optical imaging system 300 in the third example embodiment may include an optical system including a first lens 310, a second lens 320, a third lens 330, a fourth lens 340, and a fifth lens 350, and may further include a filter 370 and an image sensor IS.

The optical imaging system 300 in the third example embodiment may form a focused image on an imaging plane 380 of the image sensor IS. The imaging plane 380 may refer to a surface on which a focused image is formed by an optical imaging system. In an example, the imaging plane 380 may refer to one surface of the image sensor IS on which light is received.

Figure 5:
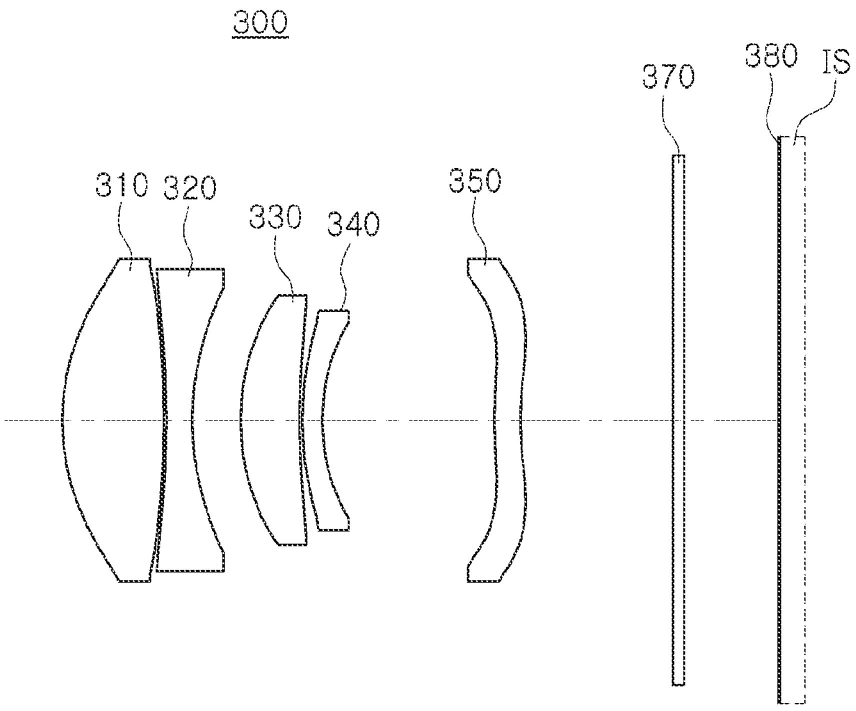
FIG. 5 is a diagram illustrating an example optical imaging system according to a third example embodiment.

Although not illustrated in FIG. 5, the optical imaging system 300 may further include a reflective member R (FIG. 15) disposed in front of the first lens 310 and having a reflective surface that changes a path of light. In the third example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 5 below.

TABLE 4

| | S1 | S2 | S3 | S4 | S5 | S6 |
|---|---|---|---|---|---|---|
| Conic Constant (K) | −0.67258 | −99.00000 | 97.49800 | 0.00000 | 0.00000 | −0.07552 |
| 4th Coefficient (A) | 1.5128E−05 | 2.2191E−04 | −6.5288E−05 | −1.1672E−03 | −5.5861E−04 | −8.1068E−04 |
| 6th Coefficient (B) | −1.5868E−05 | −7.7041E−06 | 1.6242E−05 | −5.8934E−05 | −4.6455E−05 | −2.2661E−05 |
| 8th Coefficient (C) | −1.0719E−06 | −9.8215E−07 | −9.0232E−07 | 2.7014E−07 | −1.8291E−08 | −1.9193E−06 |
| 10th Coefficient (D) | −4.0847E−08 | −9.5109E−08 | −1.2800E−07 | 1.9644E−07 | 3.5870E−07 | 2.5331E−08 |
| 12th Coefficient (E) | −1.5147E−09 | −4.2905E−09 | −1.3036E−08 | −1.2270E−08 | 2.9772E−08 | 1.9633E−07 |
| 14th Coefficient(F) | −2.8803E−11 | −1.9582E−10 | −8.6113E−10 | −4.2051E−09 | 6.5213E−09 | 4.5778E−08 |
| 16th Coefficient (G) | 4.5059E−12 | −2.7803E−11 | −3.7076E−11 | −7.5074E−10 | 5.2618E−10 | 4.1697E−09 |
| 18th Coefficient (H) | −9.5468E−13 | 1.8389E−12 | 3.6135E−13 | −5.5324E−11 | 2.0863E−11 | −1.7698E−10 |
| 20th Coefficient (J) | 2.5397E−14 | 1.6251E−13 | 3.2132E−13 | 1.1687E−11 | −1.7045E−11 | −2.1568E−10 |

| | S7 | S8 | S9 | S10 | S11 | S12 |
|---|---|---|---|---|---|---|
| Conic Coefficient (K) | 0.26498 | −0.92638 | −2.57360 | 1.02810 | −8.37140 | −5.03820 |
| 4th Coefficient (A) | −9.9991E−04 | −3.6957E−04 | −1.9038E−03 | −1.3893E−03 | −4.0396E−03 | −4.6693E−03 |
| 6th Coefficient (B) | 8.2990E−05 | 7.6680E−05 | −6.8259E−05 | 2.0829E−04 | −1.1804E−04 | 1.7996E−05 |
| 8th Coefficient (C) | 1.3755E−05 | 3.2877E−05 | −3.0848E−06 | −3.7592E−05 | 1.1598E−05 | 7.6129E−06 |
| 10th Coefficient (D) | 4.8742E−06 | 6.5958E−06 | −4.1405E−06 | −6.7933E−06 | 4.8391E−07 | 1.3341E−08 |
| 12th Coefficient (E) | 5.8840E−07 | 4.2469E−07 | −6.8348E−07 | 2.3833E−07 | −1.5465E−08 | −2.4877E−08 |
| 14th Coefficient (F) | 6.6712E−08 | 5.1166E−08 | −3.2432E−08 | 6.8499E−09 | −3.7533E−09 | −9.9716E−10 |
| 16th Coefficient (G) | 6.4327E−09 | 5.9823E−09 | 4.1342E−09 | −4.1045E−09 | 1.3933E−14 | 1.9553E−10 |
| 18th Coefficient (H) | 2.0057E−10 | 4.6032E−11 | 1.9997E−09 | 2.2852E−09 | −3.0871E−12 | −1.1070E−11 |
| 20th Coefficient (J) | −3.2966E−10 | −1.1904E−10 | −1.4404E−10 | −1.1245E−10 | 8.2208E−13 | 2.8425E−13 |

TABLE 5

| Surface No. | Note | Radius of Curvature | Thickness or Distance | Refractive Index | Abbe Number | Focal Length |
|---|---|---|---|---|---|---|
| S1 | First Lens | 4.2994663 | 2.000 | 1.537 | 55.7 | 6.523 |
| S2 | | −15.76502 | 0.050 | | | |
| S3 | Second Lens | −16.46547 | 0.500 | 1.646 | 23.5 | −5.98498 |
| S4 | | 5.0925379 | 0.957 | | | |
| S5 | Third Lens | 4.2766847 | 1.155 | 1.679 | 19.2 | 8.981 |
| S6 | | 13.358993 | 0.050 | | | |
| S7 | Fourth Lens | 5.7826016 | 0.400 | 1.537 | 55.7 | −18.6452 |
| S8 | | 3.8549855 | 3.389 | | | |
| S9 | Fifth Lens | 7.9053798 | 0.500 | 1.646 | 23.5 | −31.2964 |
| S10 | | 5.2564001 | 3.000 | | | |
| S11 | Filter | Infinity | 0.210 | 1.519 | 64.2 | |
| S12 | | Infinity | 1.887 | | | |
| S13 | Imaging Plane | Infinity | | | | |

A total focal length f of the optical imaging system 300 in the third example embodiment is 15 mm, and the IMG HT is 5.4 mm.

In the third example embodiment, the first lens 310 may have positive refractive power, and the first surface of the first lens 310 may be convex, and the second surface of the first lens 310 may be convex.

The second lens 320 may have negative refractive power, and the first surface of the second lens 320 may be concave, and the second surface of the second lens 320 may be concave.

The third lens 330 may have positive refractive power, the first surface of the third lens 330 may be convex, and the second surface of the third lens 330 may be concave.

The fourth lens 340 may have negative refractive power, the first surface of the fourth lens 340 may be convex, and the second surface of the fourth lens 340 may be concave.

The fifth lens 350 may have negative refractive power, the first surface of the fifth lens 350 may be convex in a paraxial region, and the second surface of the fifth lens 350 may be concave in the paraxial region.

Additionally, the fifth lens 350 may have at least one inflection point formed on at least one of the first surface and the second surface. In an example, the first surface of the fifth lens 350 may be convex in the paraxial region and concave in a portion or region, other than the paraxial region. The second surface of the fifth lens 350 may be concave in the paraxial region and convex in a portion or region, other than the paraxial region.

Each surface of the first lens 310 to the fifth lens 350 may have an aspherical coefficient as illustrated in Table 6 below. In an example, both the object-side surfaces and the image-side surfaces of the first lens 310 to the fifth lens 350 may be aspherical.

TABLE 6

| | S1 | S2 | S3 | S4 | S5 |
|---|---|---|---|---|---|
| Conic Constant (K) | −0.67634 | −2.28380 | −57.43000 | 0.44953 | 0.27087 |
| 4th Coefficient (A) | −3.8638E−03 | 7.7933E−03 | −1.1545E−03 | −2.9016E−03 | −1.2920E−02 |
| 6th Coefficient (B) | 1.0379E−02 | −1.4960E−02 | 1.1789E−04 | 1.0125E−04 | 5.1593E−02 |
| 8th Coefficient (C) | −1.4024E−02 | 2.0357E−02 | −9.3485E−07 | 6.0249E−06 | −1.1540E−01 |
| 10th Coefficient (D) | 1.1984E−02 | −1.8104E−02 | −7.4096E−08 | 2.2504E−06 | 1.6131E−01 |
| 12th Coefficient (E) | −6.9042E−03 | 1.0891E−02 | −1.7227E−08 | −4.6270E−08 | −1.5123E−01 |
| 14th Coefficient (F) | 2.7861E−03 | −4.5936E−03 | 5.5619E−10 | −2.9425E−08 | 9.8823E−02 |
| 16th Coefficient (G) | −8.0564E−04 | 1.3902E−03 | 5.4863E−10 | −1.9271E−09 | −4.6079E−02 |
| 18th Coefficient(H) | 1.6882E−04 | −3.0541E−04 | −1.2840E−11 | −3.6783E−11 | 1.5517E−02 |
| 20th Coefficient(J) | −2.5653E−05 | 4.8754E−05 | 6.2450E−13 | −3.0521E−11 | −3.7787E−03 |

| | S6 | S7 | S8 | S9 | S10 |
|---|---|---|---|---|---|
| Conic Constant (K) | 3.30620 | 2.13370 | 0.63500 | −88.73600 | −29.53900 |
| 4th Coefficient (A) | −2.0648E−03 | 2.4298E−02 | −3.4479E−02 | −1.2666E−02 | −7.0323E−03 |
| 6th Coefficient (B) | 2.2286E−04 | −1.5090E−01 | 1.9762E−01 | 4.8619E−03 | −2.3456E−03 |
| 8th Coefficient (C) | −3.7165E−05 | 4.2016E−01 | −6.7852E−01 | −1.2484E−02 | −5.2882E−04 |
| 10th Coefficient (D) | −4.1852E−06 | −7.3721E−01 | 1.4704E+00 | 1.3490E−02 | 1.5202E−03 |
| 12th Coefficient (E) | −1.0883E−06 | 8.7796E−01 | −2.1264E+00 | −9.2052E−03 | −1.1312E−03 |
| 14th Coefficient (F) | −1.1206E−07 | −7.3703E−01 | 2.1411E+00 | 4.4312E−03 | 5.3820E−04 |
| 16th Coefficient (G) | −1.7036E−08 | 4.4577E−01 | −1.5409E+00 | −1.5585E−03 | −1.8187E−04 |
| 18th Coefficient (H) | 8.1248E−09 | −1.9633E−01 | 8.0334E−01 | 4.0357E−04 | 4.4403E−05 |
| 20th Coefficient (J) | 1.6555E−09 | 6.2977E−02 | −3.0404E−01 | −7.6520E−05 | −7.8106E−06 |

Figure 6:
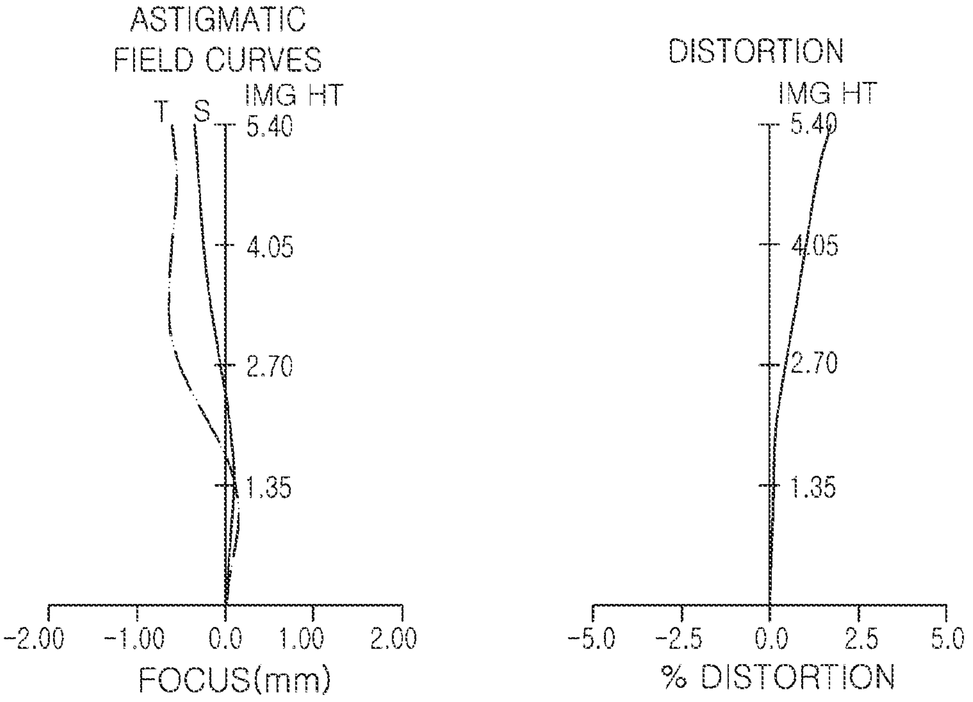
FIG. 6 is a diagram illustrating aberration properties of the example optical imaging system illustrated in FIG. 5.

The above-configured optical imaging system may have aberration properties illustrated in FIG. 6.

An optical imaging system 400 according to a fourth example embodiment will be described with reference to FIGS. 7 and 8.

An optical imaging system 400 in the fourth example embodiment may include an optical system including a first lens 410, a second lens 420, a third lens 430, a fourth lens 440, and a fifth lens 450, and may further include a filter 470 and an image sensor IS.

The optical imaging system 400 in the fourth example embodiment may form a focused image on an imaging plane 480 of the image sensor IS. The imaging plane 480 may refer to a surface on which a focused image is formed by an optical imaging system. As an example, the imaging plane 480 may refer to one surface of the image sensor IS on which light is received.

Figure 7:
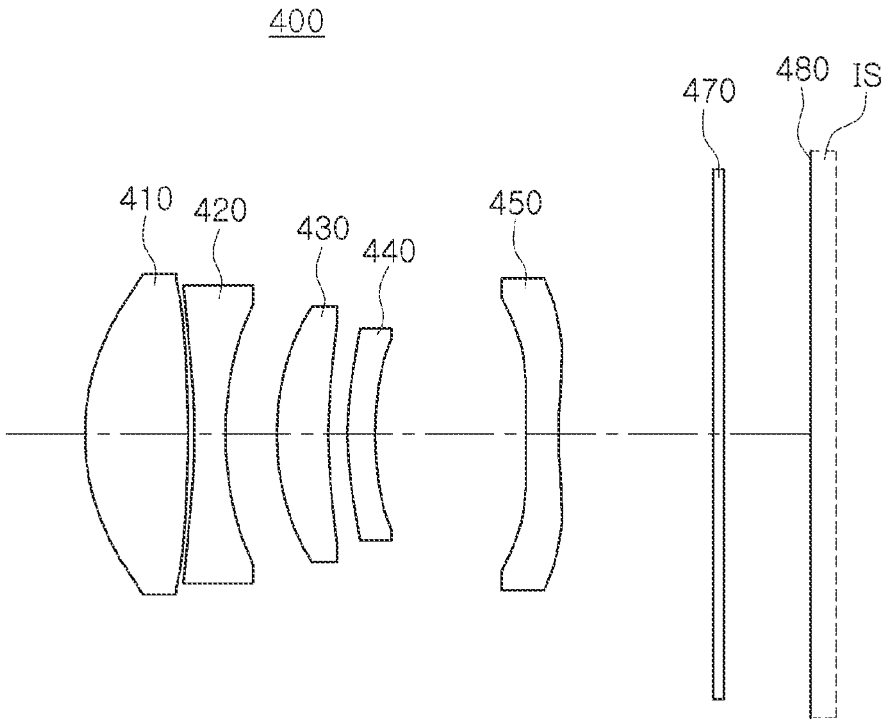
FIG. 7 is a diagram illustrating an example optical imaging system according to a fourth example embodiment.

Although not illustrated in FIG. 7, the optical imaging system 400 may further include a reflective member R (FIG. 15) disposed in front of the first lens 410 and having a reflective surface that changes a path of light. In the fourth example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 7 below.

TABLE 7

| Surface No. | Note | Radius of Curvature | Thickness or Distance | Refractive Index | Abbe Number | Focal Length |
|---|---|---|---|---|---|---|
| S1 | First Lens | 4.34802 | 2.000 | 1.537 | 55.7 | 6.784 |
| S2 | | −18.777 | 0.123 | | | |
| S3 | Second Lens | −16.3763 | 0.600 | 1.644 | 23.5 | −6.36169 |
| S4 | | 5.54265 | 1.000 | | | |
| S5 | Third Lens | 4.78818 | 1.000 | 1.656 | 21.5 | 12.849 |
| S6 | | 10.1747 | 0.377 | | | |
| S7 | Fourth Lens | 6.91461 | 0.534 | 1.667 | 20.4 | −112.736 |
| S8 | | 6.13652 | 2.923 | | | |
| S9 | Fifth Lens | 20.3751 | 0.644 | 1.537 | 55.7 | −20.7742 |
| S10 | | 7.12585 | 3.000 | | | |
| S11 | Filter | Infinity | 0.210 | 1.518 | 64.2 | |
| S12 | | Infinity | 1.688 | | | |
| S13 | Imaging Plane | Infinity | | | | |

A total focal length f of the optical imaging system 400 in the fourth example embodiment is 14.9997 mm, and IMG HT is 5.4 mm.

In the fourth example embodiment, the first lens 410 may have positive refractive power, and the first surface of the first lens 410 may be convex, and the second surface of the first lens 410 may be convex.

The second lens 420 may have negative refractive power, and the first surface of the second lens 420 may be concave, and the second surface of the second lens 420 may be concave.

The third lens 430 may have positive refractive power, the first surface of the third lens 430 may be convex, and the second surface of the third lens 430 may be concave.

The fourth lens 440 may have negative refractive power, the first surface of the fourth lens 440 may be convex, and the second surface of the fourth lens 440 may be concave.

The fifth lens 450 may have negative refractive power, the first surface of the fifth lens 450 may be convex in a paraxial region, and the second surface of the fifth lens 450 may be concave in the paraxial region.

Additionally, the fifth lens 450 may have at least one inflection point formed on at least one of the first surface and the second surface. In an example, the first surface of the fifth lens 450 may be convex in the paraxial region and concave in a portion or region, other than the paraxial region. The second surface of the fifth lens 450 may be concave in the paraxial region and convex in a portion or region, other than the paraxial region.

Each surface of the first lens 410 to the fifth lens 450 may have an aspherical coefficient as illustrated in Table 8 below. In an example, both the object-side surfaces and the image-side surfaces of the first lens 410 to the fifth lens 450 may be aspherical.

TABLE 8

| | S1 | S2 | S3 | S4 | S5 |
|---|---|---|---|---|---|
| Conic Coefficient (K) | −0.63988 | 0.18003 | −53.57500 | 0.55990 | 0.51511 |
| 4th Coefficient (A) | 1.9085E−03 | 2.1973E−02 | 1.5314E−02 | 8.3304E−03 | 5.5266E−03 |
| 6th Coefficient(B) | −3.5463E−03 | −7.1261E−02 | −7.4534E−02 | −5.4606E−02 | −9.4210E−03 |
| 8th Coefficient (C) | 4.9863E−03 | 1.0364E−01 | 1.1552E−01 | 9.7481 E−02 | 5.6880E−03 |
| 10th Coefficient (D) | −4.3435E−03 | −8.7132E−02 | −1.0173E−01 | −1.0728E−01 | −2.2457E−03 |
| 12th Coefficient (E) | 2.5783E−03 | 4.8168E−02 | 5.8781E−02 | 8.0482E−02 | 6.7475E−04 |
| 14th Coefficient (F) | −1.0798E−03 | −1.8632E−02 | −2.3722E−02 | −4.2825E−02 | −1.4423E−04 |
| 16th Coefficient (G) | 3.2463E−04 | 5.1996E−03 | 6.8957E−03 | 1.6527E−02 | 1.9722E−05 |
| 18th Coefficient (H) | −7.0635E−05 | −1.0603E−03 | −1.4631E−03 | −4.6722E−03 | −1.5151E−06 |
| 20th Coefficient (J) | 1.1120E−05 | 1.5800E−04 | 2.2670E−04 | 9.6686E−04 | 4.8665E−08 |

| | S6 | S7 | S8 | S9 | S10 |
|---|---|---|---|---|---|
| Conic Coefficient Constant (K) | −1.60810 | 1.33600 | 2.00770 | −74.01600 | −59.09600 |
| 4th Coefficient (A) | 1.4693E−02 | 2.5156E−02 | −3.6128E−03 | −2.5242E−02 | −5.3329E−03 |
| 6th Coefficient (B) | −2.1631E−02 | −8.9250E−02 | 3.6690E−02 | 3.7065E−03 | −5.8781E−03 |
| 8th Coefficient (C) | 1.2843E−02 | 2.0236E−01 | −1.2969E−01 | −1.0670E−03 | 3.3463E−03 |
| 10th Coefficient (D) | −4.6558E−03 | −3.3760E−01 | 2.6432E−01 | 4.1434E−04 | −1.0712E−03 |
| 12th Coefficient (E) | 1.2022E−03 | 3.9996E−01 | −3.5471E−01 | −1.3108E−04 | 2.1804E−04 |

TABLE 8-continued

| | | | | | |
|---|---|---|---|---|---|
| 14th Coefficient (F) | −2.3506E−04 | −3.3836E−01 | 3.3173E−01 | 2.8329E−05 | −2.8253E−05 |
| 16th Coefficient(G) | 3.2958E−05 | 2.0735E−01 | −2.2169E−01 | −3.7903E−06 | 2.2449E−06 |
| 18th Coefficient (H) | −2.8680E−06 | −9.2819E−02 | 1.0698E−01 | 2.8302E−07 | −9.9127E−08 |
| 20th Coefficient (J) | 1.1281E−07 | 3.0327E−02 | −3.7265E−02 | −8.9832E−09 | 1.8541E−09 |

Figure 8:
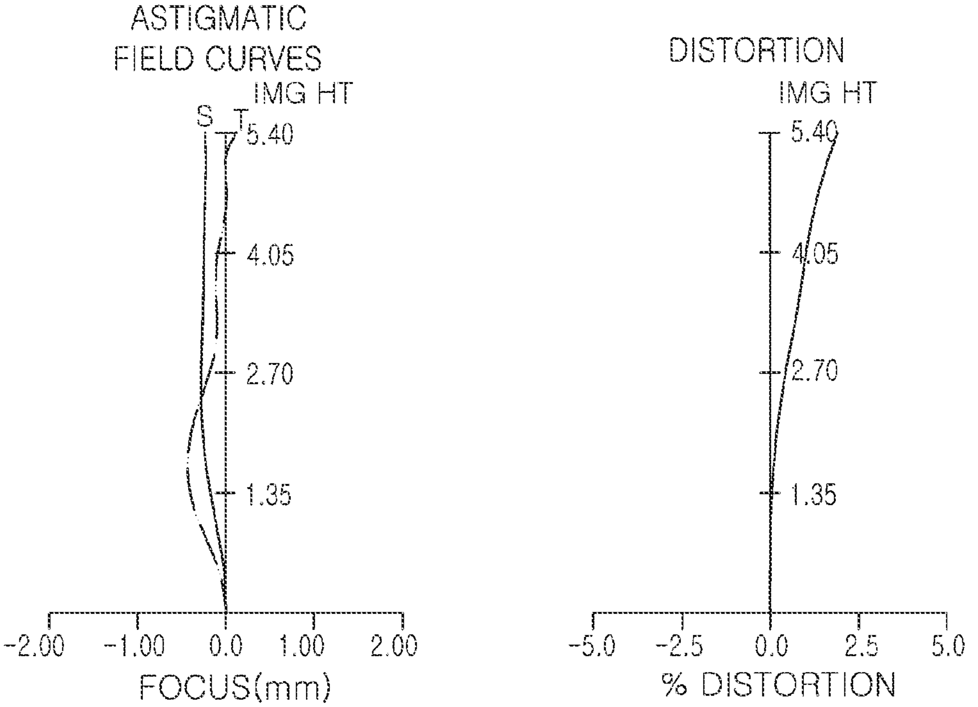
FIG. 8 is a diagram illustrating aberration properties of the example optical imaging system illustrated in FIG. 7.

Additionally, the above-configured optical imaging system may have aberration properties illustrated in FIG. 8.

An optical imaging system 500 according to a fifth example embodiment will be described with reference to FIGS. 9 and 10.

An optical imaging system 500 in the fifth example embodiment may include an optical system including a first lens 510, a second lens 520, a third lens 530, a fourth lens 540, and a fifth lens 550, and may further include a filter 570 and an image sensor IS.

The optical imaging system in the fifth example embodiment may form a focused image on an imaging plane 580 of the image sensor IS. The imaging plane 580 may refer to a surface on which a focused image is formed by an optical imaging system. In an example, the imaging plane 580 may refer to one surface of the image sensor IS on which light is received.

Figure 9:
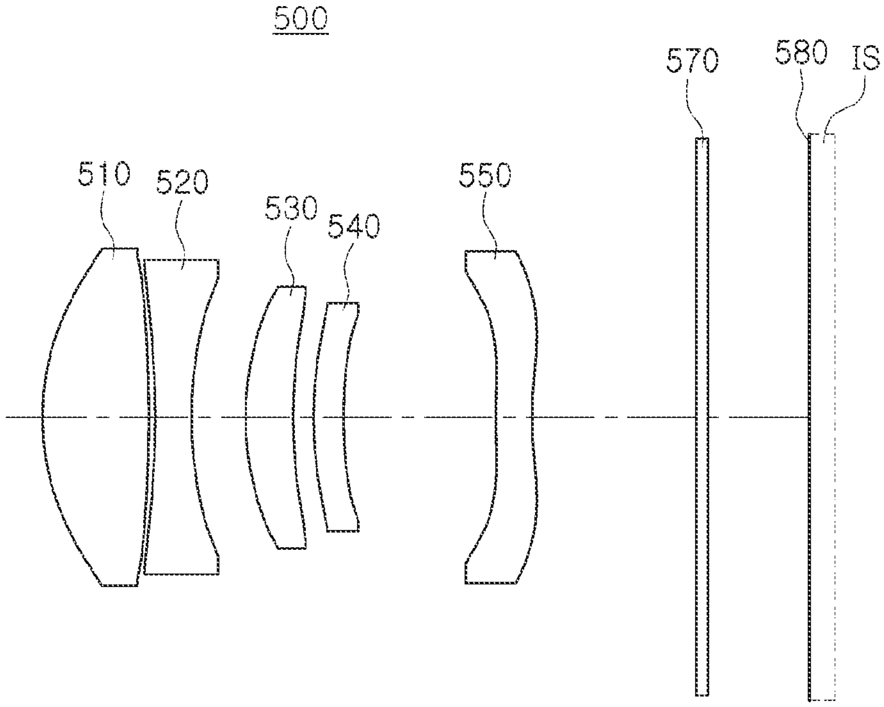
FIG. 9 is a diagram illustrating an example optical imaging system according to a fifth example embodiment.

Although not illustrated in FIG. 9, the optical imaging system may further include a reflective member R (FIG. 15) disposed in front of the first lens 510 and having a reflective surface that changes a path of light. In the fifth example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 9.

first lens 510 may be convex, and the second surface of the first lens 510 may be convex.

The second lens 520 may have negative refractive power, and the first surface of the second lens 520 may be concave, and the second surface of the second lens 520 may be concave.

The third lens 530 may have positive refractive power, the first surface of the third lens 530 may be convex, and the second surface of the third lens 530 may be concave.

The fourth lens 540 may have positive refractive power, the first surface of the fourth lens 540 may be convex, and the second surface of the fourth lens 540 may be concave.

The fifth lens 550 may have negative refractive power, the first surface of the fifth lens 550 may be convex in a paraxial region, and the second surface of the fifth lens 550 may be concave in the paraxial region.

Additionally, the fifth lens 550 may have at least one inflection point formed on at least one of the first surface and the second surface. In an example, the first surface of the fifth lens 550 may be convex in the paraxial region and concave in a portion or region, other than the paraxial region. The second surface of the fifth lens 550 may be concave in the paraxial region and convex in a portion or region, other than the paraxial region.

TABLE 9

| Surface No. | Note | Radius of Curvature | Thickness or Distance | Refractive Index | Abbe Number | Focal Length |
|---|---|---|---|---|---|---|
| S1 | First Lens | 4.40444 | 1.954 | 1.537 | 55.7 | 6.880 |
| S2 | | −19.2806 | 0.120 | | | |
| S3 | Second Lens | −17.4567 | 0.666 | 1.644 | 23.5 | −6.91172 |
| S4 | | 6.06424 | 1.000 | | | |
| S5 | Third Lens | 5.08995 | 0.863 | 1.656 | 21.5 | 17.847 |
| S6 | | 8.40284 | 0.374 | | | |
| S7 | Fourth Lens | 7.00548 | 0.554 | 1.667 | 20.4 | 130.743 |
| S8 | | 7.37695 | 2.800 | | | |
| S9 | Fifth Lens | 14.4676 | 0.676 | 1.537 | 55.7 | −19.9373 |
| S10 | | 6.05004 | 3.000 | | | |
| S11 | Filter | Infinity | 0.210 | 1.518 | 64.2 | |
| S12 | | Infinity | 1.883 | | | |
| S13 | Imaging Plane | Infinity | | | | |

A total focal length f of the optical imaging system 500 according to the fifth example embodiment is 15 mm, and IMG HT is 5.128 mm.

In the fifth example embodiment, the first lens 510 may have positive refractive power, and the first surface of the Each surface of the first lens 510 to the fifth lens 550 may have an aspherical coefficient as illustrated in Table 10 below. In an example, both the object-side surfaces and the image-side surfaces of the first lens 510 to the fifth lens 550 may be aspherical.

TABLE 10

| | S1 | S2 | S3 | S4 | S5 |
|---|---|---|---|---|---|
| Conic Constant (K) | −0.67151 | −2.06050 | −67.39700 | 0.51600 | 0.48287 |
| 4th Coefficient (A) | −9.7544E−04 | 8.9298E−03 | 5.3855E−04 | 9.6592E−04 | 1.3533E−02 |
| 6th Coefficient (B) | 3.7070E−03 | −2.8714E−02 | −2.2026E−02 | −2.3244E−02 | −3.6408E−02 |
| 8th Coefficient (C) | −4.9650E−03 | 3.9580E−02 | 3.3095E−02 | 3.9136E−02 | 5.8110E−02 |
| 10th Coefficient (D) | 4.1990E−03 | −2.8768E−02 | −2.4019E−02 | −4.1540E−02 | −6.7755E−02 |
| 12th Coefficient (E) | −2.3418E−03 | 1.2652E−02 | 9.9311E−03 | 3.0969E−02 | 5.6345E−02 |

TABLE 10-continued

| | | | | | |
|---|---|---|---|---|---|
| 14th Coefficient (F) | 8.9903E−04 | −3.5434E−03 | −2.2711E−03 | −1.6822E−02 | −3.3560E−02 |
| 16th Coefficient (G) | −2.4448E−04 | 6.2316E−04 | 1.5889E−04 | 6.7901E−03 | 1.4514E−02 |
| 18th Coefficient (H) | 4.7772E−05 | −5.9034E−05 | 6.6690E−05 | −2.0467E−03 | −4.5935E−03 |
| 20th Coefficient (J) | −6.7196E−06 | −1.1844E−07 | −2.4662E−05 | 4.5742E−04 | 1.0621E−03 |

| | S6 | S7 | S8 | S9 | S10 |
|---|---|---|---|---|---|
| Conic Constant (K) | −1.25120 | 1.48320 | 1.75320 | −95.98000 | −54.35500 |
| 4th Coefficient (A) | 1.8194E−02 | 4.6046E−02 | 3.1108E−02 | −2.1824E−02 | 3.0220E−03 |
| 6th Coefficient (B) | −3.4014E−02 | −2.0546E−01 | −1.7731E−01 | −6.6542E−03 | −1.8476E−02 |
| 8th Coefficient (C) | 3.1043E−02 | 5.2291E−01 | 5.7733E−01 | 1.5928E−02 | 1.7662E−02 |
| 10th Coefficient (D) | −1.6899E−02 | −9.0013E−01 | −1.2497E+00 | −1.8903E−02 | −1.3015E−02 |
| 12th Coefficient (E) | 2.3405E−03 | 1.0763E+00 | 1.8722E+00 | 1.4688E−02 | 7.2515E−03 |
| 14th Coefficient (F) | 4.7088E−03 | −9.1427E−01 | −1.9899E+00 | −7.7684E−03 | −2.9614E−03 |
| 16th Coefficient (G) | −4.6141E−03 | 5.6129E−01 | 1.5263E+00 | 2.8613E−03 | 8.7898E−04 |
| 18th Coefficient (H) | 2.2951E−03 | −2.5123E−01 | −8.5201E−01 | −7.4334E−04 | −1.8951E−04 |
| 20th Coefficient (J) | −7.3358E−04 | 8.1937E−02 | 3.4585E−01 | 1.3645E−04 | 2.9590E−05 |

Figure 10:
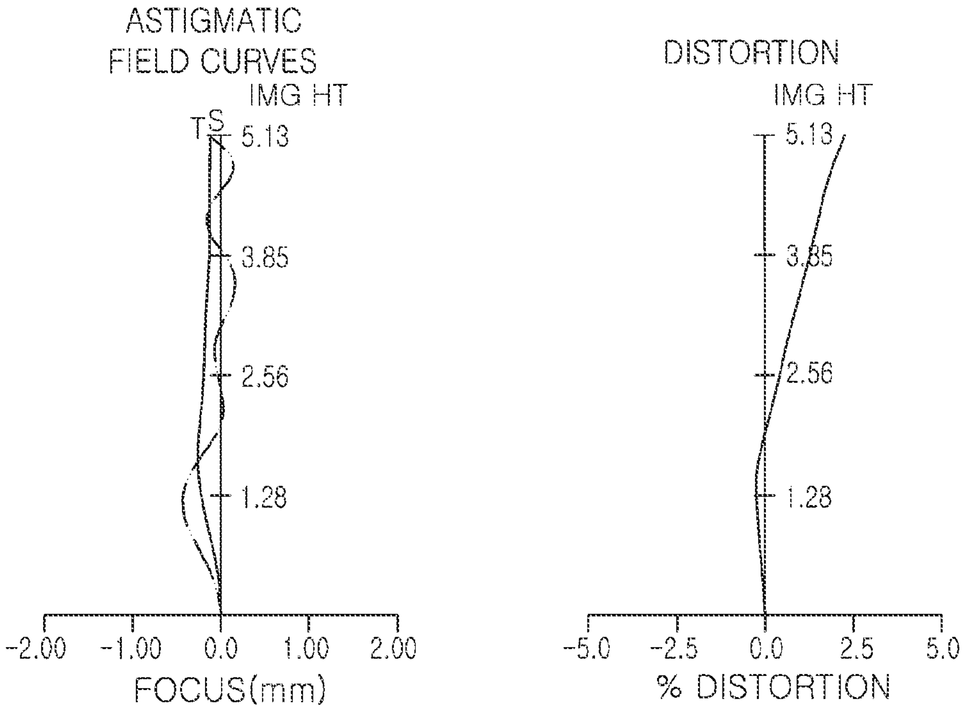
FIG. 10 is a diagram illustrating aberration properties of the example optical imaging system illustrated in FIG. 9.

Additionally, the above-configured optical imaging system may have aberration properties illustrated in FIG. 10.

An optical imaging system 600 according to a sixth example embodiment will be described with reference to FIGS. 11 and 12.

An optical imaging system 600 in the sixth example embodiment may include an optical system including a first lens 610, a second lens 620, a third lens 630, a fourth lens 640, and a fifth lens 650, and may further include a filter 670 and an image sensor IS.

The optical imaging system 600 according to the sixth example embodiment may form a focused image on an imaging plane 680 of the image sensor IS. The imaging plane 680 may refer to a surface on which a focused image is formed by an optical imaging system. In an example, the imaging plane 680 may refer to one surface of the image sensor IS on which light is received.

Figure 11:
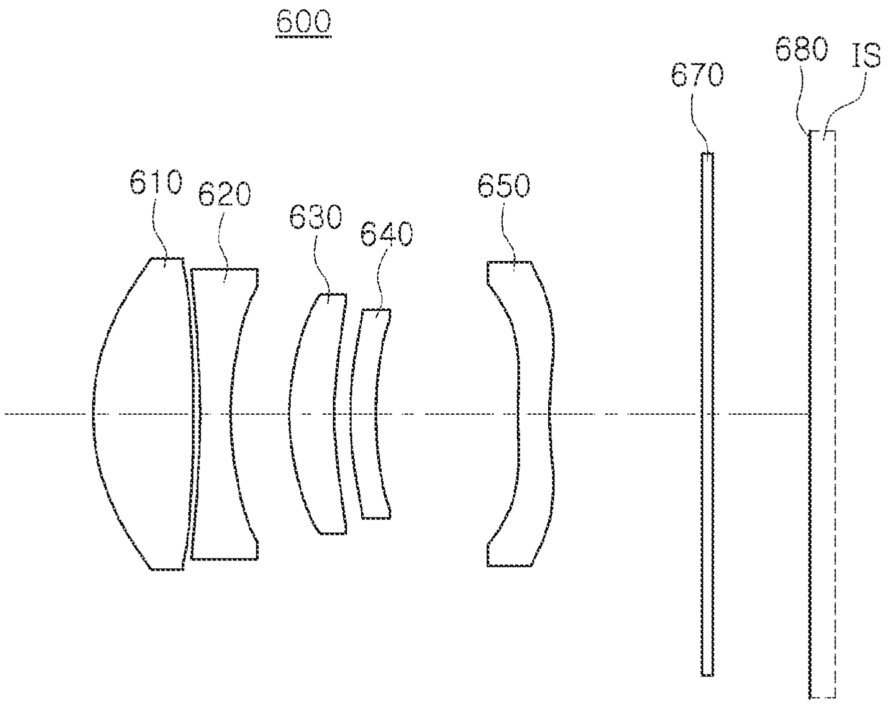
FIG. 11 is a diagram illustrating an example optical imaging system according to a sixth example embodiment.

Although not illustrated in FIG. 11, the optical imaging system 600 may further include a reflective member R disposed in front of the first lens 610 and having a reflective surface that changes a path of light. In the sixth example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 11 below.

TABLE 11

| Surface No. | Note | Radius of Curvature | Thickness or Distance | Refractive Index | Abbe Number | Focal Length |
|---|---|---|---|---|---|---|
| S1 | First Lens | 4.3645 | 1.978 | 1.537 | 55.7 | 6.910 |
| S2 | | −20.7455 | 0.130 | | | |
| S3 | Second Lens | −19.5126 | 0.604 | 1.644 | 23.5 | −7.10304 |
| S4 | | 6.04801 | 1.153 | | | |
| S5 | Third Lens | 5.10122 | 0.878 | 1.656 | 21.5 | 17.923 |
| S6 | | 8.39967 | 0.325 | | | |
| S7 | Fourth Lens | 7.26265 | 0.500 | 1.667 | 20.4 | 229.705 |
| S8 | | 7.41438 | 2.800 | | | |
| S9 | Fifth Lens | 14.3727 | 0.618 | 1.537 | 55.7 | −20.4303 |
| S10 | | 6.12583 | 3.000 | | | |
| S11 | Filter | Infinity | 0.210 | 1.518 | 64.2 | |
| S12 | | Infinity | 1.901 | | | |
| S13 | Imaging Plane | Infinity | | | | |

A total focal length f of the optical imaging system 600 in the sixth example embodiment is 15.0001 mm, and IMG HT is 5.644 mm.

In the sixth example embodiment, the first lens 610 may have positive refractive power, and the first surface of the first lens 610 may be convex, and the second surface of the first lens 610 may be convex.

The second lens 620 may have negative refractive power, and the first surface of the second lens 620 may be concave, and the second surface of the second lens 620 may be concave.

The third lens 630 may have positive refractive power, the first surface of the third lens 630 may be convex, and the second surface of the third lens 630 may be concave.

The fourth lens 640 may have positive refractive power, a first surface of the fourth lens 640 may be convex, and a second surface of the fourth lens 640 may be concave.

The fifth lens 650 may have negative refractive power, the first surface of the fifth lens 650 may be convex in a paraxial region, and the second surface of the fifth lens 650 may be concave in the paraxial region.

Additionally, the fifth lens 650 may have at least one inflection point formed on at least one of the first surface and the second surface. In an example, the first surface of the fifth lens 650 may be convex in the paraxial region and concave in a portion or region, other than the paraxial region. The second surface of the fifth lens 650 may be concave in the paraxial region and convex in a portion or region, other than the paraxial region.

Each surface of the first lens 610 to the fifth lens 650 may have an aspherical coefficient as illustrated in Table 12 below. In an example, both the object-side surfaces and the image-side surfaces of the first lens 610 to the fifth lens 650 may be aspherical.

TABLE 12

| | S1 | S2 | S3 | S4 | S5 |
|---|---|---|---|---|---|
| Conic Constant (K) | −0.66687 | −1.50090 | −88.11500 | 0.50818 | 0.49880 |
| 4th Coefficient (A) | −2.5103E−02 | −3.5443E−02 | 2.2442E−02 | 3.1186E−02 | 9.6669E−03 |
| 6th Coefficient (B) | −2.0739E−03 | 3.3559E−03 | 5.3788E−03 | −1.3391E−03 | −5.6252E−03 |
| 8th Coefficient (C) | −1.6573E−05 | 3.3607E−04 | 5.1362E−04 | −1.6513E−04 | −5.5853E−04 |
| 10th Coefficient (D) | 1.2204E−05 | −2.6866E−04 | −8.8849E−05 | 3.1699E−05 | 3.1320E−04 |
| 12th Coefficient (E) | −1.4964E−06 | −5.7963E−06 | 5.5381E−05 | 1.9190E−05 | 4.0662E−05 |
| 14th Coefficient (F) | 6.1263E−06 | −6.6550E−05 | −3.6714E−05 | −1.5291E−05 | −4.5364E−05 |
| 16th Coefficient (G) | 4.5351E−07 | −2.1600E−05 | −1.6048E−05 | −2.6231E−06 | −3.4559E−05 |
| 18th Coefficient (H) | 0.0000E+00 | 0.0000E+00 | 0.0000E+00 | 0.0000E+00 | 0.0000E+00 |
| 20th Coefficient (J) | 0.0000E+00 | 0.0000E+00 | 0.0000E+00 | 0.0000E+00 | 0.0000E+00 |
| | **S6** | **S7** | **S8** | **S9** | **S10** |
| Conic Constant (K) | −1.31770 | 1.44780 | 1.74710 | −99.00000 | −66.77000 |
| 4th Coefficient (A) | −1.6547E−02 | −1.2554E−02 | 5.7597E−03 | 1.1048E−01 | 4.4359E−02 |
| 6th Coefficient (B) | −3.8119E−03 | −2.0873E−03 | −5.1883E−04 | 7.3972E−03 | −3.3810E−03 |
| 8th Coefficient (C) | −1.0675E−03 | −7.9453E−04 | −2.1993E−04 | −5.2684E−04 | −1.3146E−03 |
| 10th Coefficient (D) | 3.3236E−04 | 1.0794E−07 | −1.7242E−05 | −6.7157E−04 | −4.1559E−04 |
| 12th Coefficient (E) | 6.4221E−05 | −4.2442E−05 | −2.9424E−05 | −1.4153E−04 | −2.7004E−04 |
| 14th Coefficient (F) | −8.9728E−06 | −3.9954E−05 | −2.8534E−05 | 2.4922E−04 | −1.5683E−04 |
| 16th Coefficient(G) | −1.6590E−05 | −1.4964E−05 | −2.1343E−05 | 1.4398E−04 | −3.5512E−05 |
| 18th Coefficient (H) | 0.0000E+00 | 0.0000E+00 | 0.0000E+00 | 0.0000E+00 | 0.0000E+00 |
| 20th Coefficient (J) | 0.0000E+00 | 0.0000E+00 | 0.0000E+00 | 0.0000E+00 | 0.0000E+00 |

Figure 12:
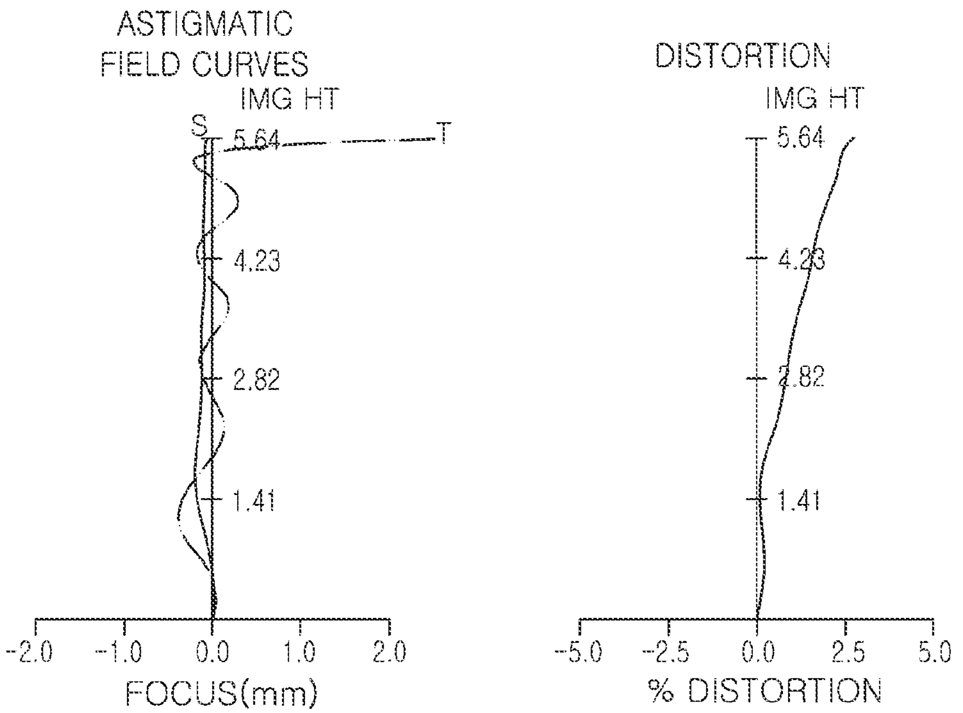
FIG. 12 is a diagram illustrating aberration properties of the optical imaging system illustrated in FIG. 11.

Additionally, the above-configured optical imaging system may have the aberration properties illustrated in FIG. 12.

An optical imaging system 700 according to a seventh example embodiment will be described with reference to FIGS. 13 and 14.

An optical imaging system 700 in the seventh example embodiment may include an optical system including a first lens 710, a second lens 720, a third lens 730, a fourth lens 740, and a fifth lens 750, and may further include a filter 770 and an image sensor IS.

The optical imaging system 700 in the seventh example embodiment may form a focused image on the imaging plane 780 of the image sensor IS. The imaging plane 780 may refer to a surface on which a focused image is formed by an optical imaging system. In an example, the imaging plane 780 may refer to a surface of the image sensor IS on which light is received.

Figure 13:
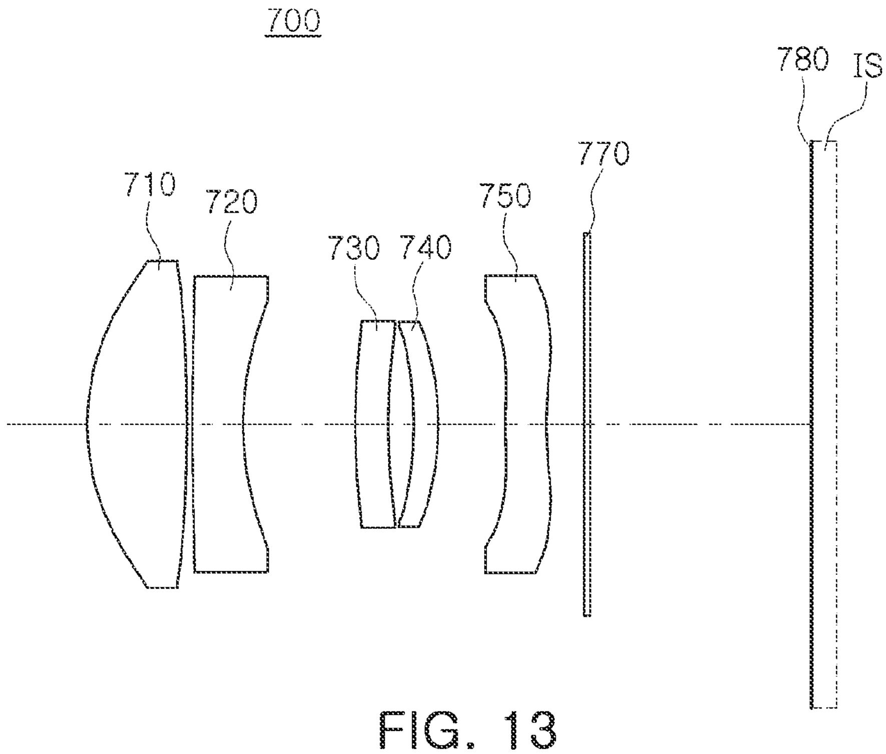
FIG. 13 is a diagram illustrating an optical imaging system according to a seventh example embodiment.

Although not illustrated in FIG. 13, the optical imaging system 700 may further include a reflective member R (FIG. 15) disposed in front of the first lens 710 and having a reflective surface that changes a path of light. In the seventh example embodiment, the reflective member R may be a prism, but may also be implemented as a mirror.

The lens properties (a radius of curvature, a thickness of the lens or a distance between the lenses, a refractive index, an Abbe number, and a focal length) of each lens are listed in Table 13 below.

TABLE 13

| Surface No. | Note | Radius of Curvature | Thickness or Distance | Refractive Index | Abbe Number | Focal Length |
|---|---|---|---|---|---|---|
| S1 | First Lens | 4.31455 | 1.939 | 1.546 | 56.0 | 6.939 |
| S2 | | −26.0711 | 0.100 | | | |
| S3 | Second Lens | 63.5152 | 0.989 | 1.644 | 23.5 | −9.99455 |
| S4 | | 5.80886 | 2.172 | | | |
| S5 | Third Lens | 10.3993 | 0.636 | 1.570 | 37.4 | −219.644 |
| S6 | | 9.38854 | 0.500 | | | |
| S7 | Fourth Lens | −6.80192 | 0.476 | 1.677 | 19.2 | 30.5652 |
| S8 | | −5.2638 | 1.300 | | | |
| S9 | Fifth Lens | 19.3382 | 0.800 | 1.537 | 55.7 | −18.5563 |
| S10 | | 6.47796 | 0.733 | | | |
| S11 | Filter | Infinity | 0.110 | 1.516 | 55.2 | |
| S12 | | Infinity | 4.302 | | | |
| S13 | Imaging Plane | Infinity | | | | |

A total focal length f of the optical imaging system 700 in the seventh example embodiment is 15 mm, and IMG HT is 5.4 mm.

In the example seventh embodiment, the first lens 710 may have positive refractive power, and the first surface of the first lens 710 may be convex, and the second surface of the first lens 710 may be convex.

The second lens 720 may have negative refractive power, the first surface of the second lens 720 may be convex, and the second surface of the second lens 720 may be concave.

The third lens 730 may have negative refractive power, the first surface of the third lens 730 may be convex, and the second surface of the third lens 730 may be concave.

The fourth lens 740 may have positive refractive power, the first surface of the fourth lens 740 may be concave, and the second surface of the fourth lens 740 may be convex.

The fifth lens 750 may have negative refractive power, the first surface of the fifth lens 750 may be convex in a paraxial region, and the second surface of the fifth lens 750 may be concave in the paraxial region.

Additionally, the fifth lens 750 may have at least one inflection point formed on at least one of the first surface and the second surface. In an example, the first surface of the fifth lens 750 may be convex in the paraxial region and concave in a portion or region, other than the paraxial region. The second surface of the fifth lens 750 may be concave in the paraxial region and convex in a portion or region, other than the paraxial region.

Each surface of the first lens 710 to the fifth lens 750 may have an aspherical coefficient as illustrated in Table 14 below. In an example, both the object-side surfaces and the image-side surfaces of the first lens 710 to the fifth lens 750 may be aspherical.

TABLE 14

| | S1 | S2 | S3 | S4 | S5 |
|---|---|---|---|---|---|
| Conic Constant (K) | −1.17880 | 5.46770 | 0.00000 | 0.00000 | 0.00000 |
| 4th Coefficient (A) | −1.0842E−02 | −4.9681E−03 | 3.2323E−03 | 0.0000E+00 | 0.0000E+00 |
| 6th Coefficient (B) | −1.5824E−03 | 8.7152E−04 | 1.7391E−03 | 0.0000E+00 | 0.0000E+00 |
| 8th Coefficient (C) | −1.4163E−04 | 5.1976E−04 | −3.2671E−04 | 0.0000E+00 | 0.0000E+00 |
| 10th Coefficient (D) | 5.9967E−06 | 1.9551E−04 | −5.8061E−04 | 0.0000E+00 | 0.0000E+00 |
| 12th Coefficient (E) | 7.8495E−06 | 3.6495E−05 | −3.5727E−04 | 0.0000E+00 | 0.0000E+00 |
| 14th Coefficient (F) | 8.2081E−06 | 2.7255E−06 | −1.4895E−04 | 0.0000E+00 | 0.0000E+00 |
| 16th Coefficient (G) | −1.8543E−07 | −8.7215E−07 | −3.1159E−05 | 0.0000E+00 | 0.0000E+00 |
| 18th Coefficient (H) | 0.0000E+00 | 0.0000E+00 | 0.0000E+00 | 0.0000E+00 | 0.0000E+00 |
| 20th Coefficient (J) | 0.0000E+00 | 0.0000E+00 | 0.0000E+00 | 0.0000E+00 | 0.0000E+00 |

| | S6 | S7 | S8 | S9 | S10 |
|---|---|---|---|---|---|
| Conic Constant (K) | 0.00000 | 0.00000 | 0.00000 | 0.00000 | −11.29500 |
| 4th Coefficient (A) | 2.7569E−03 | −1.3843E−02 | 0.0000E+00 | 0.0000E+00 | 5.5853E−02 |
| 6th Coefficient (B) | 2.8726E−04 | 3.9774E−04 | 0.0000E+00 | 0.0000E+00 | 2.1272E−03 |
| 8th Coefficient (C) | 5.3826E−05 | 2.3098E−04 | 0.0000E+00 | 0.0000E+00 | 9.7121E−05 |
| 10th Coefficient (D) | −1.4697E−06 | −1.0815E−04 | 0.0000E+00 | 0.0000E+00 | 6.0249E−06 |
| 12th Coefficient (E) | −4.3954E−06 | −1.4252E−04 | 0.0000E+00 | 0.0000E+00 | 1.8818E−05 |
| 14th Coefficient (F) | −3.6909E−06 | −7.6122E−05 | 0.0000E+00 | 0.0000E+00 | 1.8327E−05 |
| 16th Coefficient (G) | −4.6090E−06 | −2.3573E−05 | 0.0000E+00 | 0.0000E+00 | 3.6271E−06 |
| 18th Coefficient(H) | 0.0000E+00 | 0.0000E+00 | 0.0000E+00 | 0.0000E+00 | 0.0000E+00 |
| 20th Coefficient (J) | 0.0000E+00 | 0.0000E+00 | 0.0000E+00 | 0.0000E+00 | 0.0000E+00 |

Figure 14:
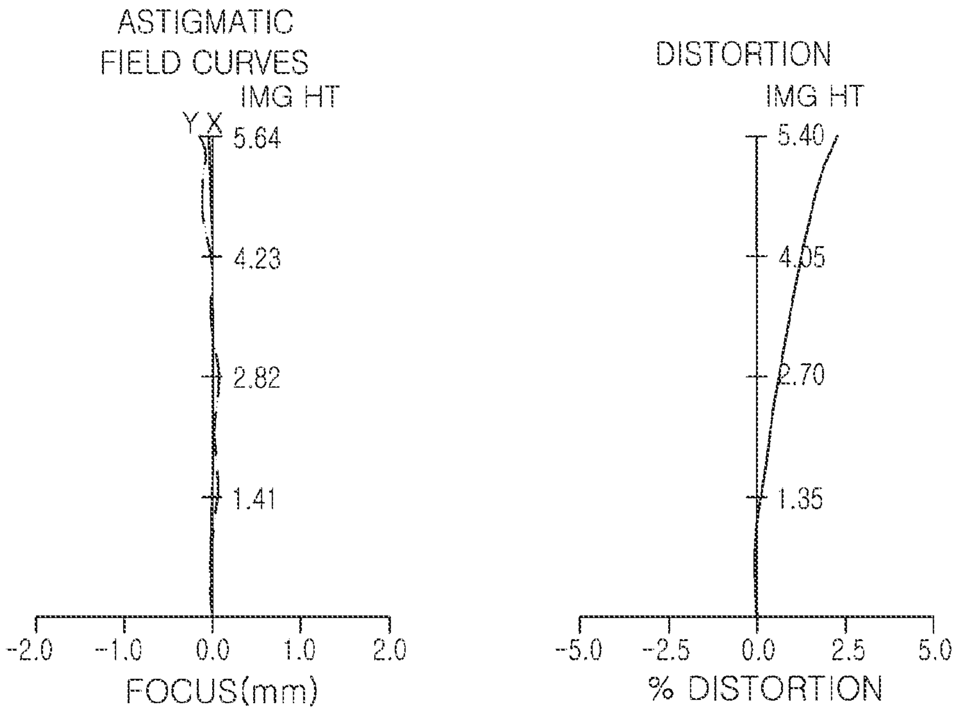
FIG. 14 is a diagram illustrating aberration properties of the optical imaging system illustrated in FIG. 13.

In addition, the above-configured optical imaging system may have aberration properties illustrated in FIG. 14.

As described above, according to the above-described optical imaging system of the one or more examples, a high-resolution image may be captured.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:

a first lens, a second lens, a third lens, a fourth lens, and a fifth lens disposed in order from an object side to an imaging side, wherein:

the optical imaging system has a total of five lenses, the first lens has positive refractive power and a convex object-side surface in a paraxial region thereof, the second lens has negative refractive power, and the third lens has positive refractive power; and $$TTL>10.2\text{ mm},\ R1/f\leq 0.35,\ 1.5<f/IMG\ HT<3.5,\text{ and } TTL/(2\times IMG\ HT)\leq 1.7,$$

where TTL is a distance from an object-side surface of the first lens to an imaging plane on an optical axis, R1 is a radius of curvature of the object-side surface of the first lens, f is a total focal length of the optical imaging system, and IMG HT is equal to half a diagonal length of the imaging plane.

2. The optical imaging system of claim 1, wherein:

$$IMG\ HT\geq 4.5\text{ mm}.$$

3. The optical imaging system of claim 1, wherein:

$$n2+n3>3.20,$$

where n2 is a refractive index of the second lens, and n3 is a refractive index of the third lens.

4. The optical imaging system of claim 1, wherein:

$$|f/f1+f/f2|<1.2,$$

where f1 is a focal length of the first lens, and f2 is a focal length of the second lens.

5. The optical imaging system of claim 1, wherein:

$$BFL/f<0.4,$$

where BFL is a distance from an image-side surface of the fifth lens to the imaging plane on an optical axis.

6. The optical imaging system of claim 1, wherein:

$$0.80 \leq TTL/f \leq 1.05.$$

7. The optical imaging system of claim 1, wherein:

$$0 \leq D1/f \leq 0.05,$$

where D1 is a distance between an image-side surface of the first lens and an object-side surface of the second lens on an optical axis.

8. The optical imaging system of claim 1, wherein:

the fourth lens has negative refractive power, and the fifth lens has negative refractive power.

9. The optical imaging system of claim 1, wherein:

the fourth lens has positive refractive power, and the fifth lens has negative refractive power.

10. The optical imaging system of claim 1, wherein:

a refractive index of at least one of the second and third lenses is greater than 1.64.

11. The optical imaging system of claim 1, wherein:

an absolute value of a focal length of each of the first and second lenses is less than an absolute value of focal lengths of each of the third lens, the fourth lens, and the fifth lens.

* * * * *